(12) United States Patent
Tomiyoshi et al.

(10) Patent No.: US 7,952,900 B2
(45) Date of Patent: May 31, 2011

(54) H-BRIDGE BUCK-BOOST CONVERTER

(75) Inventors: Kenji Tomiyoshi, Chiba (JP); Rei Hashimoto, Yokohama (JP)

(73) Assignee: Analog Devices, Inc., Norwood, MA (US)

( * ) Notice: Subject to any disclaimer, the term of this patent is extended or adjusted under 35 U.S.C. 154(b) by 322 days.

(21) Appl. No.: 12/104,305

(22) Filed: Apr. 16, 2008

(65) Prior Publication Data

US 2009/0262556 A1   Oct. 22, 2009

(51) Int. Cl.
*H02M 3/24* (2006.01)
*H02M 7/5387* (2006.01)

(52) U.S. Cl. .......................... 363/98; 363/132

(58) Field of Classification Search .............. 363/17, 363/98, 132; 323/222, 224, 225, 268, 271, 323/282, 285
See application file for complete search history.

(56) References Cited

U.S. PATENT DOCUMENTS

| 6,037,755 A | 3/2000 | Mao et al. |
| 6,166,527 A | 12/2000 | Dwelley et al. |
| 6,275,016 B1 | 8/2001 | Ivanov |
| 6,856,102 B1* | 2/2005 | Lin et al. ................ 315/291 |
| 7,088,595 B2* | 8/2006 | Nino ............................ 363/17 |
| 7,176,667 B2 | 2/2007 | Chen et al. |
| 2006/0113922 A1* | 6/2006 | Ribarich et al. ........ 315/209 R |
| 2010/0039080 A1* | 2/2010 | Schoenbauer et al. ...... 323/234 |

OTHER PUBLICATIONS

Ridley, Ray, "Current-Mode Control Modeling", Designer's Series, Part V, Ridley Engineering, Inc. (2001).
LTC3440 Datasheet —Micropower Synchronous Buck-Boost DC/DC Converter, Linear Technology, pp. 1-20.
LTC3780 Datasheet —High Efficiency, Synchronous, 4-Switch Buck-Boost Controller, Linear Technology, pp. 1-28.
TPS63000 Datasheet —High Efficient Single Inductor Buck-Boost Converter with 1.8-A Switches, Texas Instruments.

* cited by examiner

*Primary Examiner* — Matthew V Nguyen
(74) *Attorney, Agent, or Firm* — Kenyon & Kenyon LLP

(57) ABSTRACT

An H-bridge buck-boost converter includes a first half-bridge portion having at least one first transistor, an inductor portion connected to the first half-bridge portion at a first connection, a second half-bride portion connected to the inductor portion at a second connection, the second half-bridge portion having at least one second transistor, and a control portion configured to provide a first switching signal to a gate of the first transistor of the first half-bridge portion as a function of a voltage at the first connection.

24 Claims, 19 Drawing Sheets

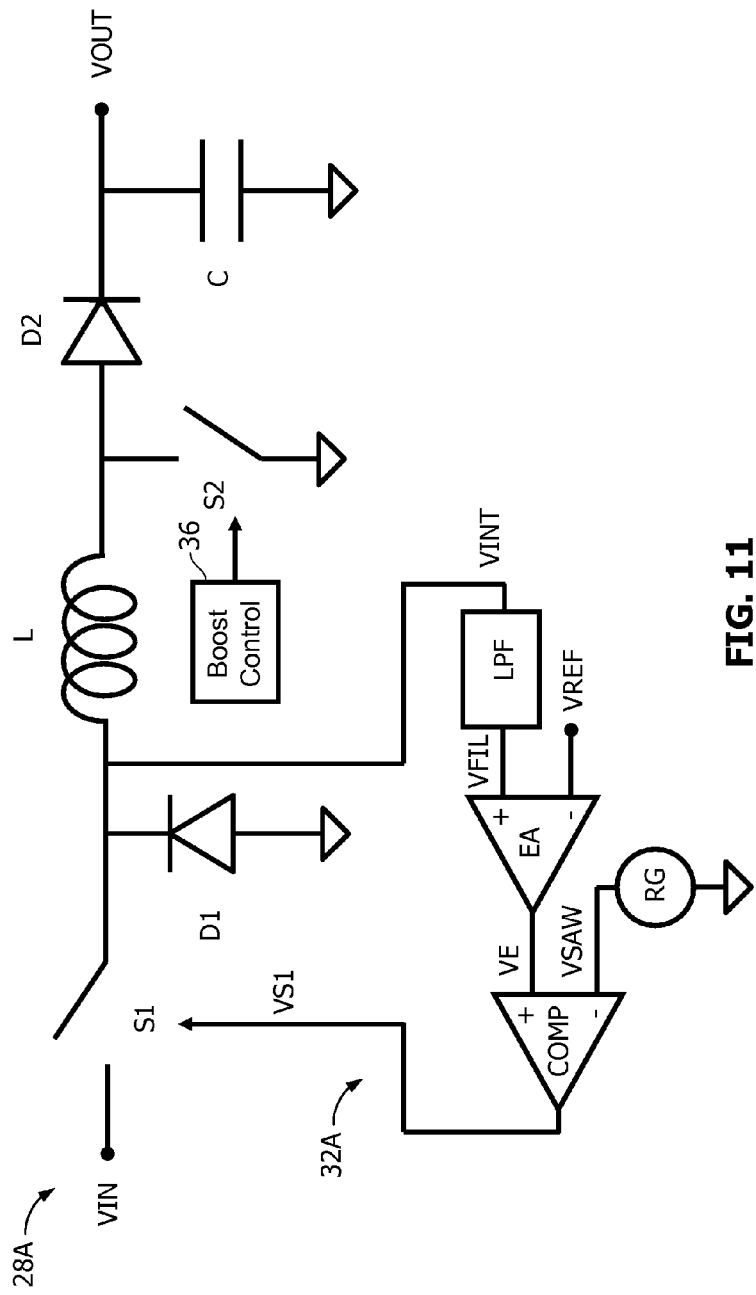
FIG. 11
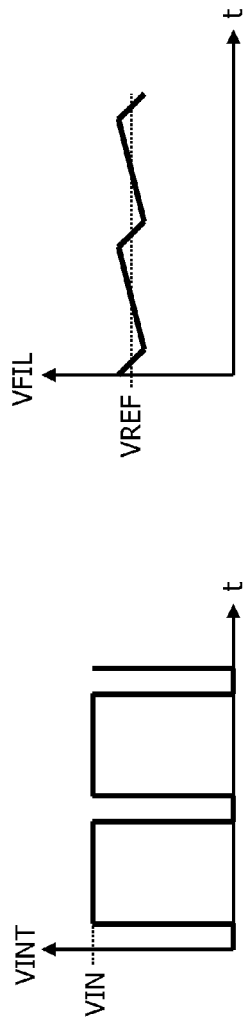
FIG. 12
FIG. 13

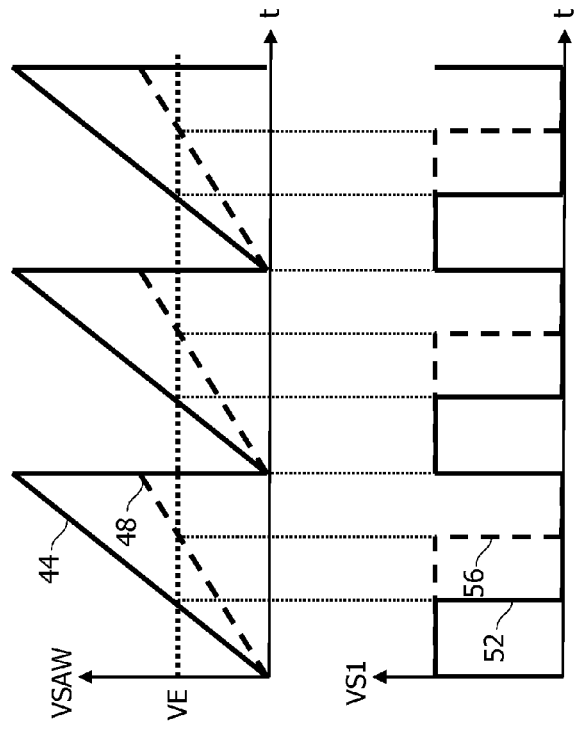
FIG. 14
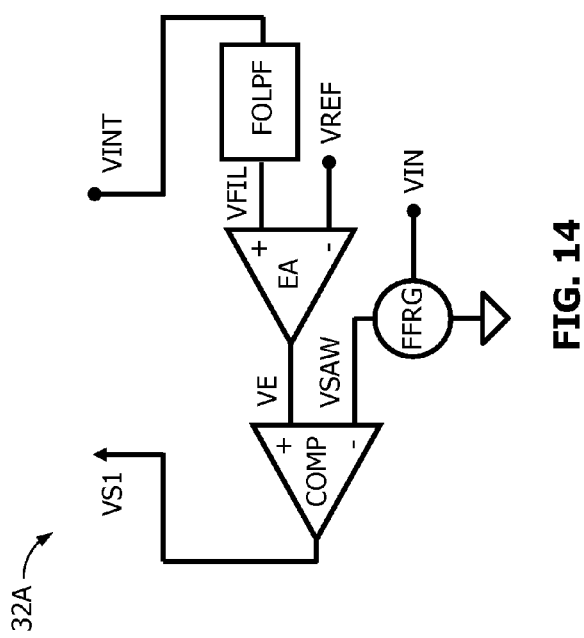
FIG. 16
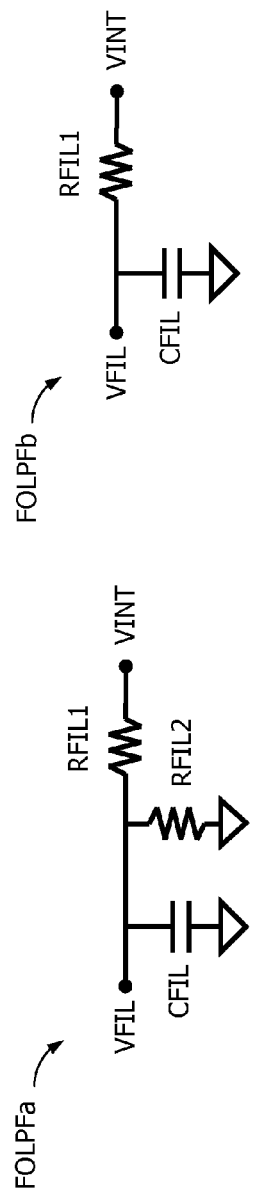
FIG. 15A
FIG. 15B

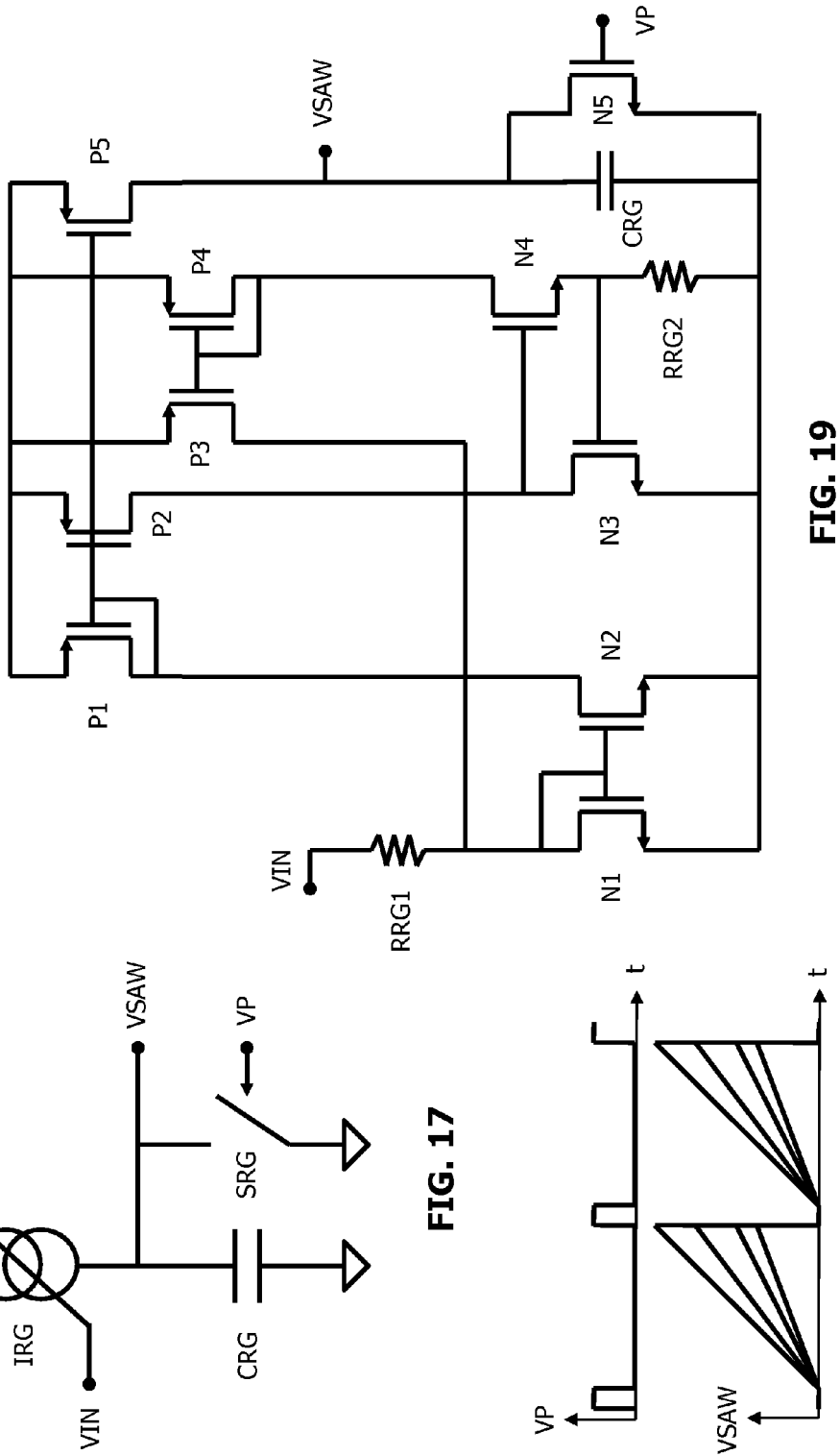
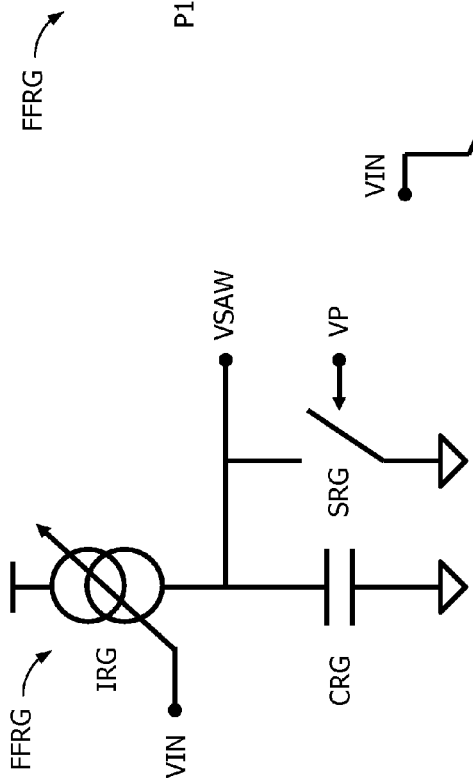
FIG. 17
FIG. 18
FIG. 19

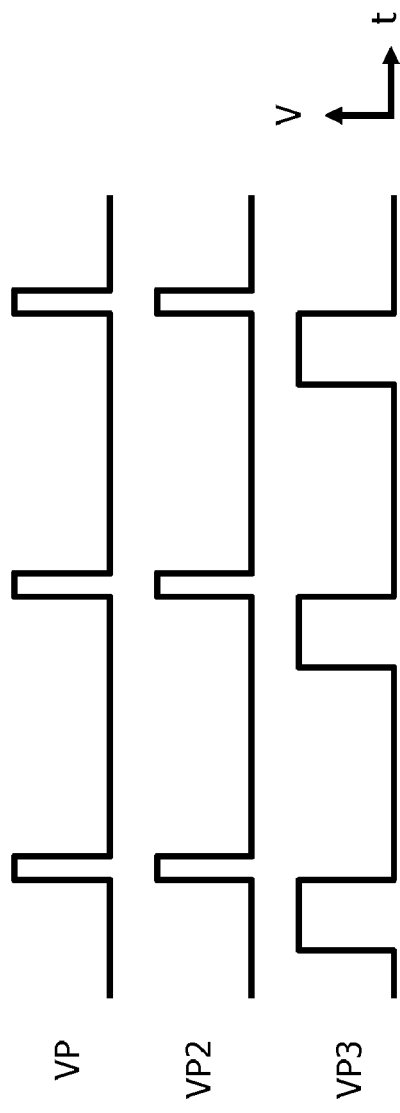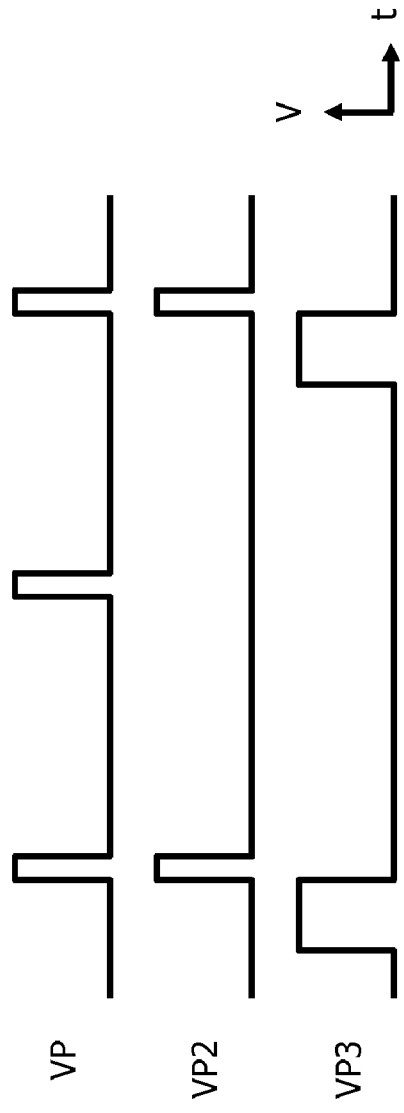

H-BRIDGE BUCK-BOOST CONVERTER

BACKGROUND INFORMATION

DC voltage conversion circuits are useful in many applications. For example, an electronic product may receive a first DC voltage externally, but be designed to use a second, different DC voltage internally, and therefore need to convert between the two. Different types of DC voltage converters exist. A boost converter receives an input voltage and produces an output voltage having a magnitude greater than that of the input voltage. Conversely, a buck converter produces an output voltage having a magnitude less than that of the input voltage.

A buck-boost converter can produce an output voltage magnitude that is either greater than or less than an input voltage magnitude. Buck-boost converters can be useful in battery-powered electronic products. Circuits in such products may be designed to use a predetermined supply-voltage magnitude range. When the battery is fresh, it may supply a voltage magnitude higher than the predetermined range, and when the battery is more depleted, it may supply a voltage magnitude lower than the range. Thus, both buck and boost conversion is needed.

One problem with buck-boost converters is that it is difficult to implement an efficient and simple control scheme for dividing the operation of the buck-boost converter between regimes of pure buck operation (buck mode), pure boost operation (boost mode), and mixed buck-boost operation (buck-boost mode).

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

FIG. 11 is a circuit schematic depicting an embodiment of the intermediate-voltage-controlled buck control portion of FIG. 9.

FIG. 12 depicts an embodiment of an intermediate voltage waveform associated with the operation of the intermediate-voltage-controlled buck control portion of FIG. 11.

FIG. 13 depicts an embodiment of a filtered intermediate voltage waveform associated with the operation of the intermediate-voltage-controlled buck control portion of FIG. 11.

FIG. 14 is a circuit schematic depicting an embodiment of the intermediate-voltage-controlled buck control portion of FIG. 11, having a first-order low-pass filter and an input-voltage feed-forward ramp generator.

FIG. 15A is a circuit schematic depicting an embodiment of the first-order low-pass filter of FIG. 14.

FIG. 15B is a circuit schematic depicting another embodiment of the first-order low-pass filter of FIG. 14.

FIG. 16 depicts embodiments of a saw wave signal and a switching signal associated with the operation of the intermediate-voltage-controlled buck control portion of FIG. 14.

FIG. 17 is a circuit schematic depicting an embodiment of the input-voltage feed-forward ramp generator of FIG. 14.

FIG. 18 depicts embodiments of a voltage pulse and saw wave signal associated with the operation of the input-voltage feed-forward ramp generator of FIG. 17.

FIG. 19 is a circuit schematic depicting an embodiment of the input-voltage feed-forward ramp generator of FIG. 17.

FIG. 30A depicts embodiments of voltage pulses associated with clocking the intermediate-voltage-controlled buck control portion and the current-mode boost control portion at a same frequency.

FIG. 30B depicts embodiments of voltage pulses associated with clocking the intermediate-voltage-controlled buck control portion and the current-mode boost control portion at different frequencies.

DETAILED DESCRIPTION OF EXAMPLE EMBODIMENTS

Figure 1:
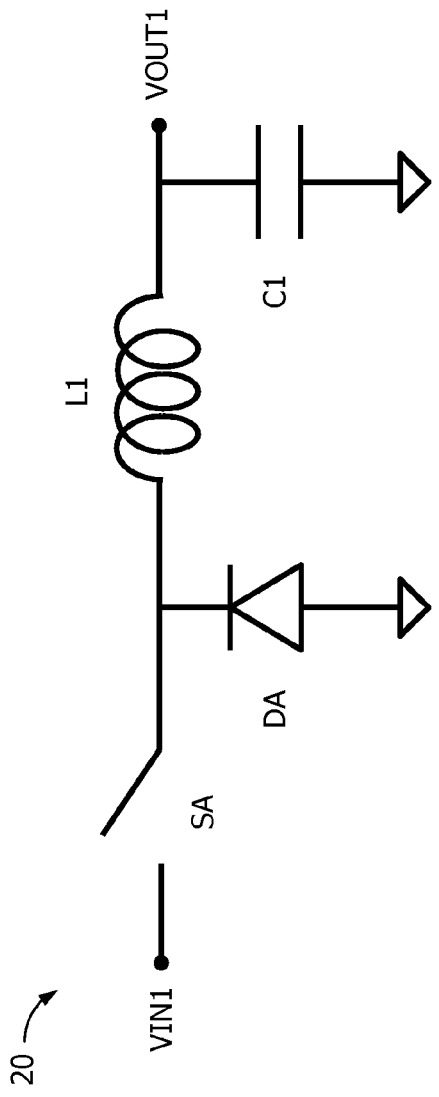
FIG. 1 is a circuit schematic depicting an embodiment of a buck converter.

FIG. 1 depicts an embodiment of a buck converter 20 configured to accept an input voltage VIN1 and produce an output voltage VOUT1 having a magnitude less than that of the input voltage VIN1. When a switch SA is closed, the input voltage VIN1 adds energy to an inductor L1, increasing its current. When the switch SA is open, energy is released from the inductor L1, decreasing its current, which flows through a diode D1 (which can also instead be a switch). If the output voltage VOUT1 is assumed to stay relatively constant, a steady-state energy-conservation analysis yields a transfer function which can be represented by: VOUT1=VIN1·D1; where D1 is the duty cycle at which the switch SA is switched, and can range in value from 0 to 1. By adjusting the value of the duty cycle D1, the magnitude of the output voltage VOUT1 can be adjustably less than the magnitude of input voltage VIN1.

Figure 2:
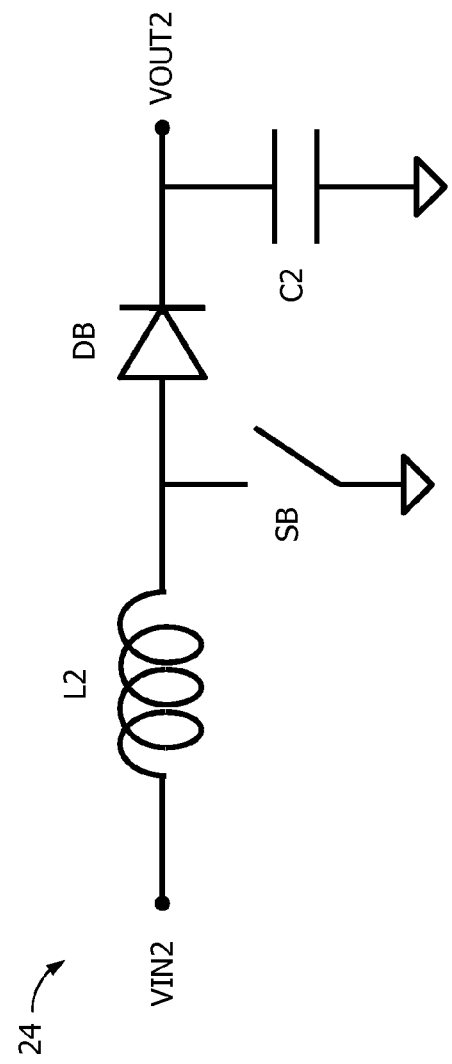
FIG. 2 is a circuit schematic depicting an embodiment of a boost converter.

FIG. 2 depicts an embodiment of a boost converter 24 configured to accept an input voltage VIN2 and produce an output voltage VOUT2 having a magnitude greater than that of the input voltage VIN2. When a switch SB is closed, the input voltage VIN2 adds energy to an inductor L2, increasing its current, which flows to ground through the switch SB. When the switch SB is opened, energy is released from the inductor L2 and its current, flowing through a diode D2 (which can also instead be a switch), decreases. Again assuming an output voltage VOUT2 stays relatively constant, a steady-state energy-conservation analysis yields a transfer function which can be represented by: VOUT2=VIN2/(1−D2); where D2 is the duty cycle at which the switch SB is switched, and can range in value from 0 to 1. By adjusting the value of the duty cycle D2, the magnitude of the output voltage VOUT2 can be adjustably greater than the magnitude of the input voltage VIN2.

Figures 3, 4:
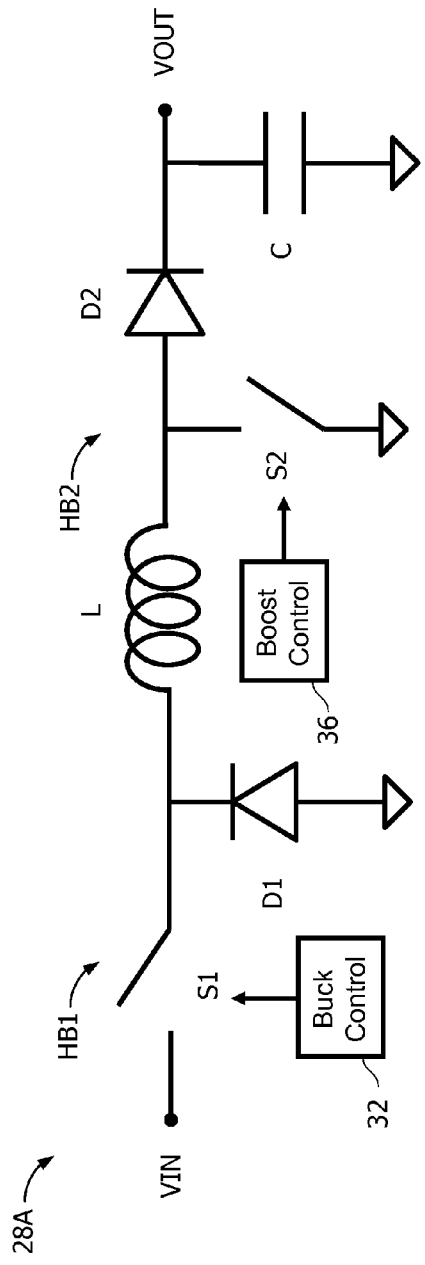
FIG. 3 is a circuit schematic depicting an embodiment of a two-switch H-bridge buck-boost converter.
FIG. 4 is a circuit schematic depicting an embodiment of a four-switch H-bridge buck-boost converter.

FIG. 3 depicts an embodiment of a two-switch H-bridge buck-boost converter 28A. An H-bridge is a configuration of four switches schematically arranged roughly akin to the capital letter H, with two switches connected in series on one side of an intervening element and two switches connected in series on the other side. The H-bridge buck-boost converter 28A of FIG. 3 includes a simplified H-bridge in which two of the switches are replaced by diodes (similar to the use of diodes in the circuits of FIGS. 1-3). FIG. 4 depicts an embodiment of a four-switch H-bridge buck-boost converter 28B in which all four switches are implemented. Two switches S1, S3 on the left-hand side of FIG. 4 form a first half-bridge HB1 (i.e., half of the H-bridge) and two switches S2, S4 on the right-hand side of FIG. 4 form a second half-bridge HB2. The H-bridge buck-boost converter 28 includes a buck control portion 32 and a boost control portion 36 that provide switching signals to switches of the first half-bridge HB1 and the second half-bridge HB2, respectively.

The H-bridge buck-boost converters 28 of FIGS. 3 and 4 is capable of operating in any of a buck mode, a boost mode or a buck-boost mode. In the boost mode, the magnitude of the output voltage VOUT can vary only in the range of being greater than or equal to the magnitude of the input voltage VIN as a result of variation of a duty cycle of switching signals provided to the switches. In buck mode, the magnitude of the output voltage VOUT can vary only in the range of being less than or equal to the magnitude of the input voltage VIN as a result of variation of the duty cycle of switching signals provided to the switches. In buck-boost mode, the magnitude of the output voltage VOUT can vary in the range of being either less than, equal to, or greater than the magnitude of the input voltage VIN as a result of variation of the duty cycle of switching signals provided to the switches.

In one embodiment, the boost mode, buck mode and buck-boost mode of the H-bridge buck-boost converters 28 of FIGS. 3 and 4 can be defined by the type of switching signals provided to the switches S1, S2, S3 and S4 of the first and second half-bridges HB1, HB2. Regarding FIG. 3, in the boost mode the first switch S1 can be kept continuously on and only the second switch S2 switched on and off with a duty cycle selected to control the degree of voltage boost. In the buck mode, the second switch S2 can be kept continuously off and only the first switch S1 switched on and off with a duty cycle selected to control the degree of voltage buck. In the buck-boost mode, both the first and second switches S1, S2 can be switched on and off with duty cycles selected to control the degree of voltage buck and/or boost. Regarding FIG. 4, in the boost mode the first switch S1 can be kept continuously on, the third switch S3 continuously off, and only the second and fourth switches S2, S4 switched on and off with duty cycles selected to control the degree of voltage boost. In the buck mode, the second switch S2 can be kept continuously off, the fourth switch S2 kept continuously on, and only the first and third switches S1, S3 switched on and off with duty cycles selected to control the degree of voltage buck. In the buck-boost mode, all four of the switches S1, S2, S3, S4 can be switched on and off with duty cycles selected to control the degree of voltage buck and/or boost.

Figure 5:
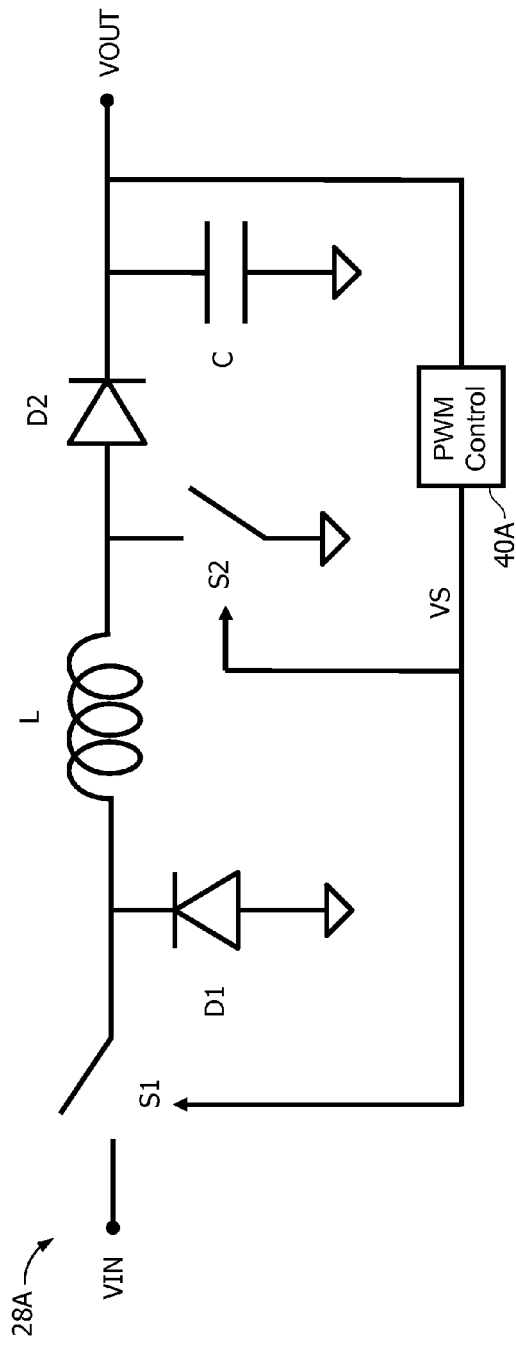
FIG. 5 is a circuit schematic depicting an embodiment of the H-bridge buck-boost converter having an embodiment of a combined pulse-width-modulation buck and boost control portion.

The buck and boost control portions 32, 36 can be implemented in different ways. FIG. 5 depicts an embodiment in which the buck and boost control portions 32, 36 are implemented as a single combined pulse-width-modulation control portion 40A. In FIG. 5, the combined control portion 40A generates a single pulse-width modulated switching signal VS for both switches S1, S2 of the H-bridge buck-boost converter 28A, the single pulse-width modulated switching signal VS being a function of the output voltage VOUT. In this configuration, the switches S1, S2 are both either on or off together, and thus the buck-boost converter 28A can operate only in the buck-boost mode. When both switches S1, S2 are closed, the converter 28A has a buck-like configuration, and when both switches S1, S2 are open, the converter 28A has a boost-like configuration. However, this may be inefficient if a particular voltage conversion scenario necessitates only either buck or boost conversion. Moreover, when both switches S1, S2 are open, the boost-like configuration has an effective input voltage of ground, which may be inefficient because the input voltage VIN may be a higher voltage from which to boost. Furthermore, in the embodiment of FIG. 5, the inductor L typically sees a relatively large voltage difference, resulting in a corresponding high inductor current ripple, which may undesirably manifest as an output voltage ripple and electrically-stressed switches. Because of this relatively high inductor ripple current, higher inductance values, possibly necessitating the use of a more expensive inductor L, may be needed to maintain an overall level of current.

Figure 6:
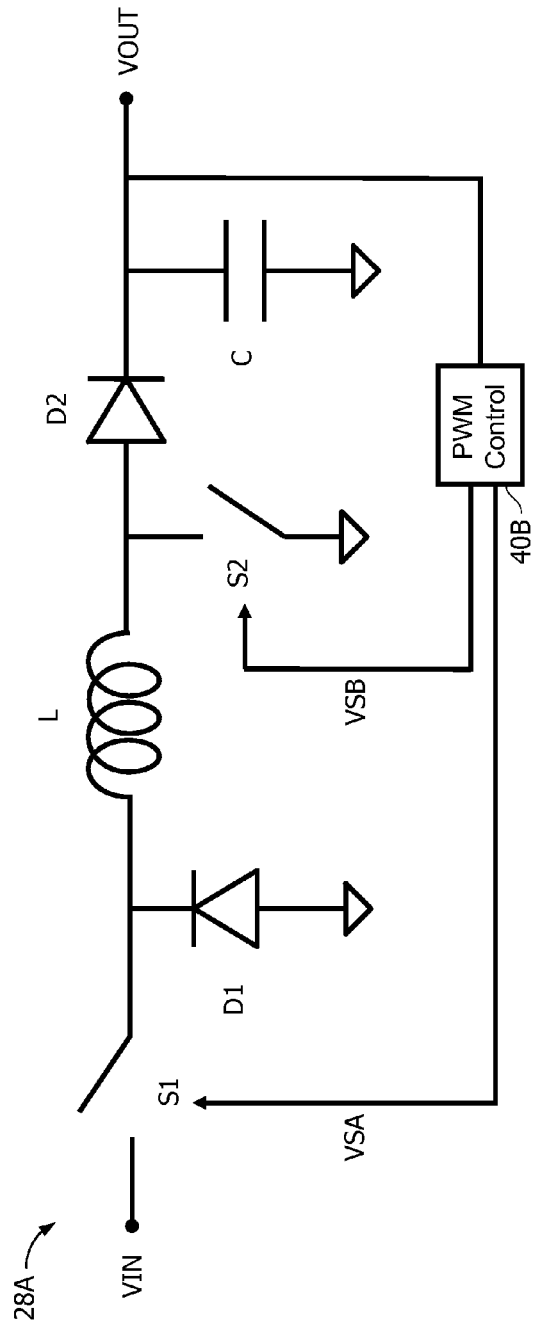
FIG. 6 is a circuit schematic depicting an embodiment of the H-bridge buck-boost converter having another embodiment of a combined pulse-width-modulation buck and boost control portion.

FIG. 6 depicts an embodiment in which the buck and boost control portions 32, 36 are implemented by another embodiment of a combined control potion 40B that generates separate pulse-width modulated switching signals VSA, VSB for the two switches S1, S2. In comparison to the embodiment of FIG. 5, the embodiment of FIG. 6 is now capable of all three of buck, boost and buck-boost modes. If the magnitude of the input voltage VIN is much greater than a magnitude of an intended output voltage VIO, the buck-boost converter 28A can be operated in buck mode by keeping the second switch S2 continuously off (i.e., open) and switching the first switch S on and off. If the magnitude of the input voltage VIN is much less than the magnitude of the intended output voltage VIO, the buck-boost converter 28A can be operated in boost mode by keeping the first switch S1 continuously on (i.e., closed) and switching the second switch S2 on and off. If the magnitude of the input voltage VIN is close in value to the magnitude of the intended output voltage VIO, the buck-boost converter 28A can be operated in buck-boost mode by switching both the first second switches S1, S2 on and off.

Figure 7:
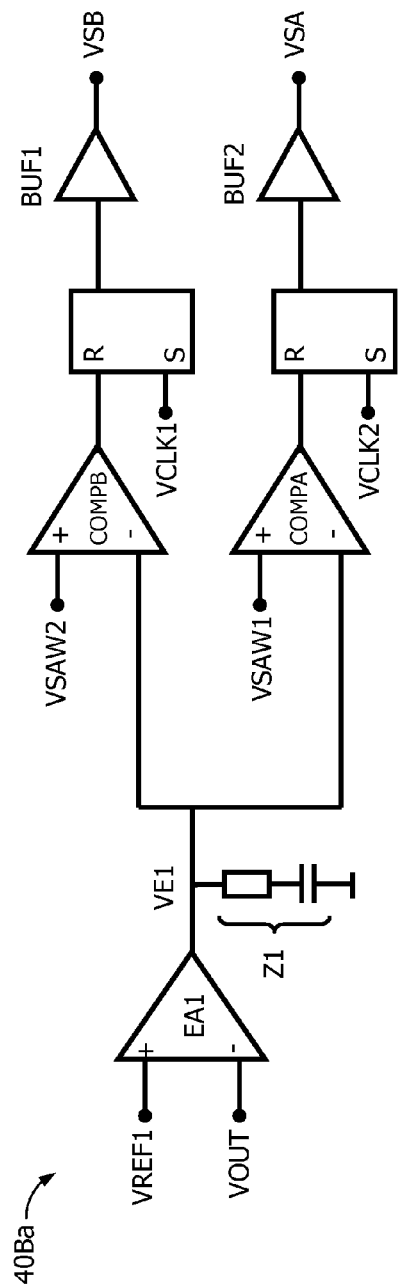
FIG. 7 is a circuit schematic depicting an embodiment of a voltage-mode combined buck and boost control portion.
Figure 8:
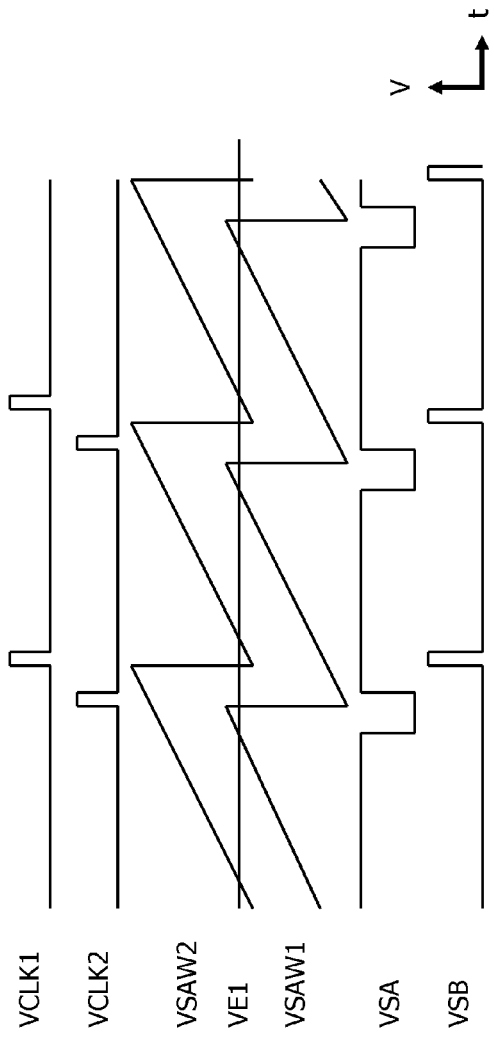
FIG. 8 depicts embodiments of voltage waveforms associated with the operation of the voltage-mode combined buck and boost control portion of FIG. 7.

FIG. 7 depicts one embodiment of the combined control portion 40Ba shown in FIG. 6. The depicted combined control portion 40Ba implements a voltage-mode feedback control in which the output voltage VOUT is regulated to a reference voltage VREF1, representing the magnitude of the intended output voltage VIO, to provide the switching signals VSA, VSB to the two switches S1, S2. FIG. 8 depicts an embodiment of voltage waveforms associated with a steady-state operation in buck-boost mode of the combined control portion 40Ba of FIG. 7. The combined control portion 40Ba includes an error amplifier EA1 that compares the output voltage VOUT and the reference voltage VREF1 to generate an error signal VE1, which is fed to the negative inputs of two comparators COMPA, COMPB. The comparators COMPA, COMPB also receive two saw-wave signals VSAW1, VSAW2 at their positive inputs. The outputs of the comparators COMPA, COMPB are fed to two RS flip-flops, which also receive two clocking signals VCLK1, VCLK2, and have outputs that pass through two buffers BUF1, BUF2 to generate the two different switching signals VSA, VSB which are fed to the first and second switches S1, S2, respectively in the embodiment of FIG. 6.

Although the waveforms of FIG. 8 depict a steady-state buck-boost mode operation, the characteristics of FIG. 8 can be examined to understand the operation of the combined control portion 40Ba in all of three of the buck, boost and buck-boost modes. In FIG. 8, the magnitude of the input voltage VIN is relatively close to the magnitude of the intended output voltage VIO, and so the error amplifier EA1 generates an error signal VE1, which is calibrated based on the value of an impedance Z1 at the output of the error amplifier EA1, to fall within the voltage range of both of the saw wave signals VSAW1, VSAW2, and thus combined control portion 40Ba generates switching signals VSA, VSB that switch both the first and second switches S1, S2 on and off to produce the buck-boost mode.

Although not directly depicted in FIG. 8, if the magnitude of the input voltage VIN increases, an upward pressure on the output voltage VOUT is produced, and the error amplifier EA1 generates an error signal VE1 having a relatively lesser magnitude. Eventually, the magnitude of the error signal VE1 will fall out of the range of the second saw wave signal VSAW2 and exist only in the range of the first saw wave signal VSAW1. When this occurs, only the first switch S1 is switched, and the second switch S2 is continuously off, producing the buck mode. Conversely, if the magnitude of the input voltage VIN decreases from a value that produced the waveforms of FIG. 8, a downward pressure on the output voltage VOUT is produced, and the error amplifier EA1 generates an error signal VE1 having a relatively greater magnitude. Eventually, the error signal magnitude will rise out of the range of the first saw wave signal VSAW1, and exist only in the range of the second saw wave signal VSAW2. When this occurs, only the second switch S2 is switched, and the first switch S1 is continuously on, producing the boost mode. Note the voltage waveforms of FIG. 8 are configured such that VSA has a logic-high enable value that turns on the first switch S1, and VSB has a logic-low enable value that turns on the second switch S2.

One possible disadvantage of the embodiment of FIGS. 6 and 7 is that the feedback loop traced from the output of the buck-boost converter 28A, through the combined control portion 40Ba to the two switches S1, S2, and back forward to the output through the inductor L, has a relatively low bandwidth due to the presence of multiple pole-producing impedances, and is thus difficult to advantageously compensate for stability purposes. For example, the feedback loop includes both an LC impedance formed by the inductor L and output capacitor C in the forward portion of the loop, and an impedance Z1 in feedback portion of the loop. The presence of these at least two separate pole-producing impedances limits the bandwidth of the embodiment of FIGS. 6 and 7.

Figure 9:
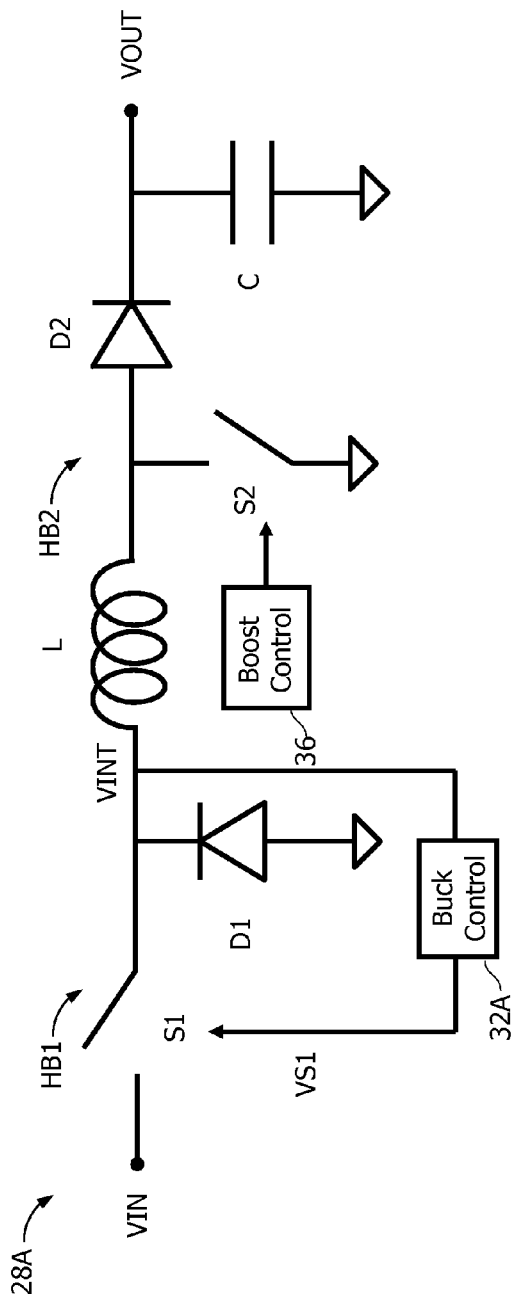
FIG. 9 is a circuit schematic depicting an embodiment of a two-switch H-bridge buck-boost converter having an embodiment of an intermediate-voltage-controlled buck control portion.
Figure 10:
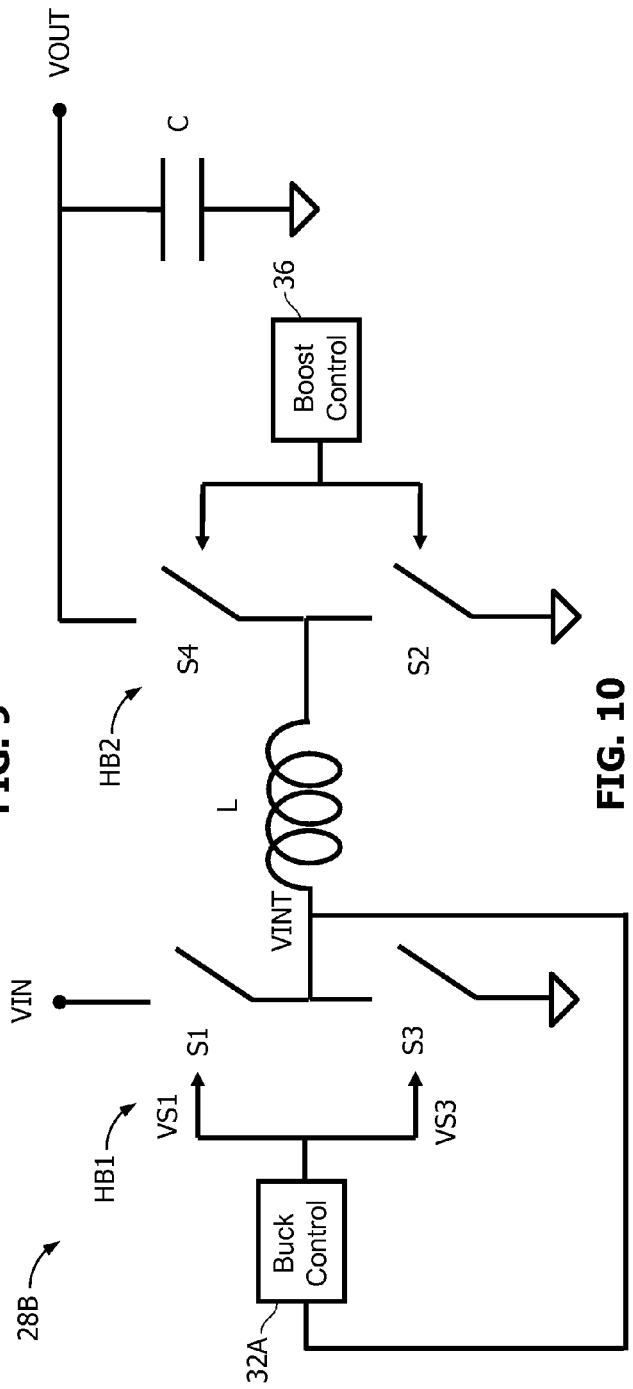
FIG. 10 is a circuit schematic depicting an embodiment of a four-switch H-bridge buck-boost converter having an embodiment of the intermediate-voltage-controlled buck control portion.

FIG. 9 depicts an embodiment of the two-switch H-bridge buck-boost converter 28A having separate buck and boost control portions 32, 36 in which the buck control portion 32 is implemented as a intermediate-voltage-controlled feedback buck control portion 32A in which the switching signal VS1 is provided to the first switch S1 of the first half-bridge HB1 as a function of an intermediate voltage VINT at a first (i.e., left-hand side or input) side of the inductor L. FIG. 10 depicts an embodiment similar to that shown in FIG. 9, but in which, as with the difference between the embodiments of FIGS. 3 and 4, the H-bridge buck-boost converter 28B is implemented with a four-transistor H-bride. In FIG. 10, the intermediate-voltage-controlled feedback buck control portion 32A provides first and third switching signals VS1, VS3 to the first and third switches S1, S3 as a function of the intermediate voltage VINT.

The switching signals VS1, VS3 provided to the first and third switches S1, S3 can implement antiphase switching of the first and third switches S1, S3. Similarly, in one embodiment, the switching signals VS2, VS4 provided to the second and fourth switches S2, S4 implement antiphase switching of the second and fourth switches S2, S4. In antiphase switching, for example of the first and third switches S1, S3, the first switch S1 is on whenever the third switch S3 is off, and vice versa, i.e., the third switch S3 is on whenever the first switch S1 is off.

One advantage of the embodiments of FIGS. 9 and 10, relative to the embodiment of FIGS. 6 and 7, is that the feedback loop including the intermediate-voltage-controlled buck control portion 32A does not include the pole-producing effect of the inductor L and output capacitance C of the H-bridge buck-boost converter 28 because the intermediate-voltage-controlled buck control portion 32A regulates a node on the left-hand side, i.e., input or primary side, of the inductor L, instead of at the output of the inductor L or H-bridge buck-boost converter 28. Thus, the intermediate-voltage-controlled buck control portion 32A of FIGS. 9 and 10 is capable of achieving a higher bandwidth in comparison to the combined control portion 40B of FIG. 6 and 7, if other factors are comparable.

FIG. 11 depicts one embodiment of the intermediate-voltage-controlled buck control portion 32A of FIG. 9. The intermediate-voltage-controlled buck control portion 32A of FIG. 11 includes a low-pass filter LPF that receives the intermediate voltage VINT from the input side of the inductor L and passes a filtered output voltage VFIL to an error amplifier EA. The error amplifier EA also receives a reference voltage VREF, to which an average value of the intermediate voltage VINT is to be regulated, that is a function of the magnitude of the intended output voltage VIO. The error amplifier EA amplifies the difference between the filtered intermediate voltage VFIL and the reference voltage VREF and generates an error signal VE having a magnitude that is a function of this difference. The error signal VE is fed to a comparator COMP, which also receives a saw wave signal VSAW. The saw wave signal VSAW is generated by a ramp generator RG. The comparator COMP compares the error signal VE and the saw wave signal VSAW and generates the first switching signal VS1 to switch the first switch S1.

The first switching signal VS1 generated by the intermediate-voltage-controlled buck control portion 32A depicted in FIG. 11 is a pulse-width-modulated switching signal. Generally speaking, comparators generate either logic high or logic low output signals based on whether a signal at the positive input terminal is greater than a signal at the negative input terminal, or vice versa, respectively. Thus, the comparator COMP of FIG. 11 generates a square-wave first switching signal VS1 having a logic-high value when the error signal VE has a magnitude greater than that of the saw wave signal VSAW, and a logic-low value when the error signal VE has a magnitude less than that of the saw wave signal VSAW. The first switching signal VS1 switches on the first switch S1 at one of these logic levels and switches off the first switch S1 at the other of these logic levels. The particular logic level assigned to either the on or off state can be selected by the particular implementation of the switch S1.

The duty cycle of the square-wave first switching signal VS1 is adjusted by the feedback action of the intermediate-voltage-controlled control portion 32A to regulate the average value of the intermediate voltage VINTAVG. More specifically, the feedback loop of FIG. 11 regulates the low-pass filtered intermediate voltage VFIL, which is a measure of the average value of the intermediate voltage VINTAVG. The degree of regulation of the filtered intermediate voltage VFIL to the reference voltage VREF that is achieved is a function of parameters of the feedback loop such as, e.g., the gain and offset voltage of the error amplifier EA. FIG. 12 depicts an embodiment of the intermediate voltage VINT, which is switched between the input voltage VIN and ground (assuming no voltage drop across the diode D1), according to the duty cycle D of the switching signal VS1, where D is the ratio of the on-time (i.e., time spent at logic-high in FIG. 12) to the total period (i.e., time for one cycle in FIG. 12) of the switching signal VS1. FIG. 13 depicts one embodiment of the low-pass filtered intermediate voltage VFIL, a measure of the average value of the intermediate voltage VINTAVG, and its relation to the reference voltage VREF.

The low pass filter LPF can be a first-order low-pass filter FOLPF. FIG. 14 depicts an exemplary embodiment of the intermediate-voltage-controlled buck control portion 32A of FIG. 11 in which the low-pass filter LPF is implemented as the first-order low-pass filter FOLPF. Embodiments including the first-order low-pass filter FOLPF may be advantageous to preserve the bandwidth of the intermediate-voltage-control led feedback buck control portion 32A of FIG. 11. That is, the intermediate-voltage-controlled buck control portion 32A potentially has an advantageous bandwidth, in comparison to the embodiments of FIGS. 6 and 7, because it does not include the inductor L or output capacitor C in the buck control feedback loop. Using the first-order low-pass filter FOLPF is one way to maximize this potential bandwidth increase of the intermediate-voltage-controlled buck control portion 32A. The intermediate-voltage-controlled buck control portion 32A of In FIG. 14 ensures that buck control feedback loop will have a total phase shift of approximately 90°, i.e., substantially not greater than 90°. Such a phase shift is easier to compensate (for stability purposes) than the phase shift imparted on fed back signals in the embodiment of FIG. 6 and 7, which can be as much as 180°. In one embodiment, the first-order low-pass filter FOLPF includes a single capacitor and at least one resistor. FIG. 15A depicts an exemplary embodiment of the first-order low-pass filter FOLPFa having a single capacitor CFIL and first and second resistors RFIL1, RFIL2. The first and second resistors RFIL1, RFIL2 in FIG. 15A can form a voltage divider that steps down the intermediate voltage VINT. FIG. 15B depicts another exemplary embodiment of the first-order low-pass filter FOLPFb having a single capacitor CFIL and a single resistor RFIL1.

The ramp generator RG can be an input-voltage feed-forward ramp generator FFRG. FIG. 14 depicts an exemplary embodiment of the intermediate-voltage-controlled buck control portion 32A of FIG. 11 in which the ramp generator RG is the input-voltage feed-forward ramp generator FFRG. Embodiments including the input-voltage feed-forward ramp generator FFRG may further realize the speed advantage of the intermediate-voltage-controlled buck control portion 32A of FIG. 11. The input-voltage feed-forward ramp generator FFRG generates the saw wave signal VSAW such that it has a peak-to-peak voltage magnitude that is a function of the input voltage VIN. Generally speaking, this will increase the speed at which the intermediate-voltage-controlled buck control portion 32A of FIG. 11 is capable of responding to a change in the input voltage VIN during the regulation of the average value of the intermediate voltage VINTAVG.

FIG. 16 depicts exemplary embodiments of the saw wave signal VSAW generated by the input-voltage feed-forward ramp generator FFRG, as well as corresponding embodiments of the first switching signal VS1 resulting from the use of the depicted embodiments of the saw wave signal VSAW in the intermediate-voltage-controlled buck control portion 32A of FIG. 14. In the top portion of FIG. 16, two different states of the saw wave signal VSAW are shown. A first state 44 of the saw wave signal VSAW is the result of a first magnitude of the input voltage VIN. A second state 48 of the saw wave signal VSAW is the result of a second magnitude of the input voltage VIN that is less than the first magnitude of the input voltage VIN. As depicted, the input-voltage feed-forward ramp generator FFRG generates the saw wave signal VSAW having a peak-to-peak voltage magnitude as a function of the magnitude of the input voltage VIN. That is, for a larger magnitude of the input voltage VIN, the saw wave signal VSAW has a larger peak-to-peak voltage magnitude.

The presence of the input-voltage feed-forward ramp generator FFRG in the intermediate-voltage-controlled buck control portion 32A has the effect of modulating the duty cycle of the first switching signal VS1. In the bottom portion of FIG. 16, corresponding states 52, 56 of the first switching signal VS1, for a given value of the error signal VE, are shown for each state 44, 48 of the saw wave signal VSAW depicted in the top portion of FIG. 16. The decreased peak-to-peak voltage magnitude of the second state 48 of the generated saw wave signal VSAW, which is a result of the decreased magnitude of the input voltage VIN, has resulted in the second state 56 of the first switching signal VS1 having a larger duty cycle that the first state 52 of the first switching signal VS1. The increased duty cycle of the second state 56 of the first switching signal VS1 can then change the degree of voltage conversion provided as a result of the operation of the intermediate-voltage-controlled buck control portion 32A to help regulate the average magnitude of the intermediate voltage VINT to the reference voltage VREF.

Embodiments of the intermediate-voltage-controlled buck control 32A having the input-voltage feed-forward ramp generator FFRG thus implement regulation of the average value of the intermediate voltage VINT through the action of at least two different mechanisms, including the feedback action of the feedback loop including the intermediate-voltage-controlled buck control portion 32A, and the feed-forward action resulting from the affect of the input-voltage feed-forward ramp generator FFRG.

FIG. 17 depicts one embodiment of the input-voltage feed-forward ramp generator FFRG. The depicted embodiment includes an input-voltage-controlled current source IRG that receives the input voltage VIN at an input terminal, a capacitor CRG connected to the input-voltage-controlled current source IRG, a switch SRG connected to at least one end of the capacitor CRG and receiving a voltage pulse VP at a switching terminal, and an output terminal, providing the saw wave signal VSAW, connected at the switched node of the capacitor CRG. FIG. 18 depicts exemplary embodiments of voltage waveforms associated with the input-voltage feed-forward ramp generator FFRG depicted in FIG. 17. The top portion of FIG. 18 depicts an exemplary voltage pulse VP applied to the switch SRG, and the bottom portion depicts exemplary embodiments of the saw wave signal VSAW corresponding to various different magnitudes of the input voltage VIN. In operation, the input-voltage-controlled current source IRG generates a current as a function of the input voltage VIN, and feeds this current onto the top node of the capacitor CRG while the switch SRG is open, increasing the voltage VSAW at this node to create the up-ramp of the saw wave signal VSAW. The differently-sloped up-ramps depicted in FIG. 18 are the result of different values of current from the current source IRG as a result of different magnitudes of the input voltage VIN. Periodically, the voltage pulse VP closes the switch SRG, discharging the capacitor CRG, forming the down-side of the saw wave signal VSAW depicted in FIG. 18.

FIG. 19 depicts one embodiment of a transistor based implementation of the input-voltage feed-forward ramp generator FFRG of FIG. 17. The depicted embodiment includes the input-voltage-controlled current source having a plurality of NMOS transistors N1, N2, N3, N4, a plurality of PMOS transistors P1, P2, P3, P4, P5, and a plurality of resistors RRG1, RRG5; and the switch SRG being implemented by an NMOS transistor N5.

Figure 20:
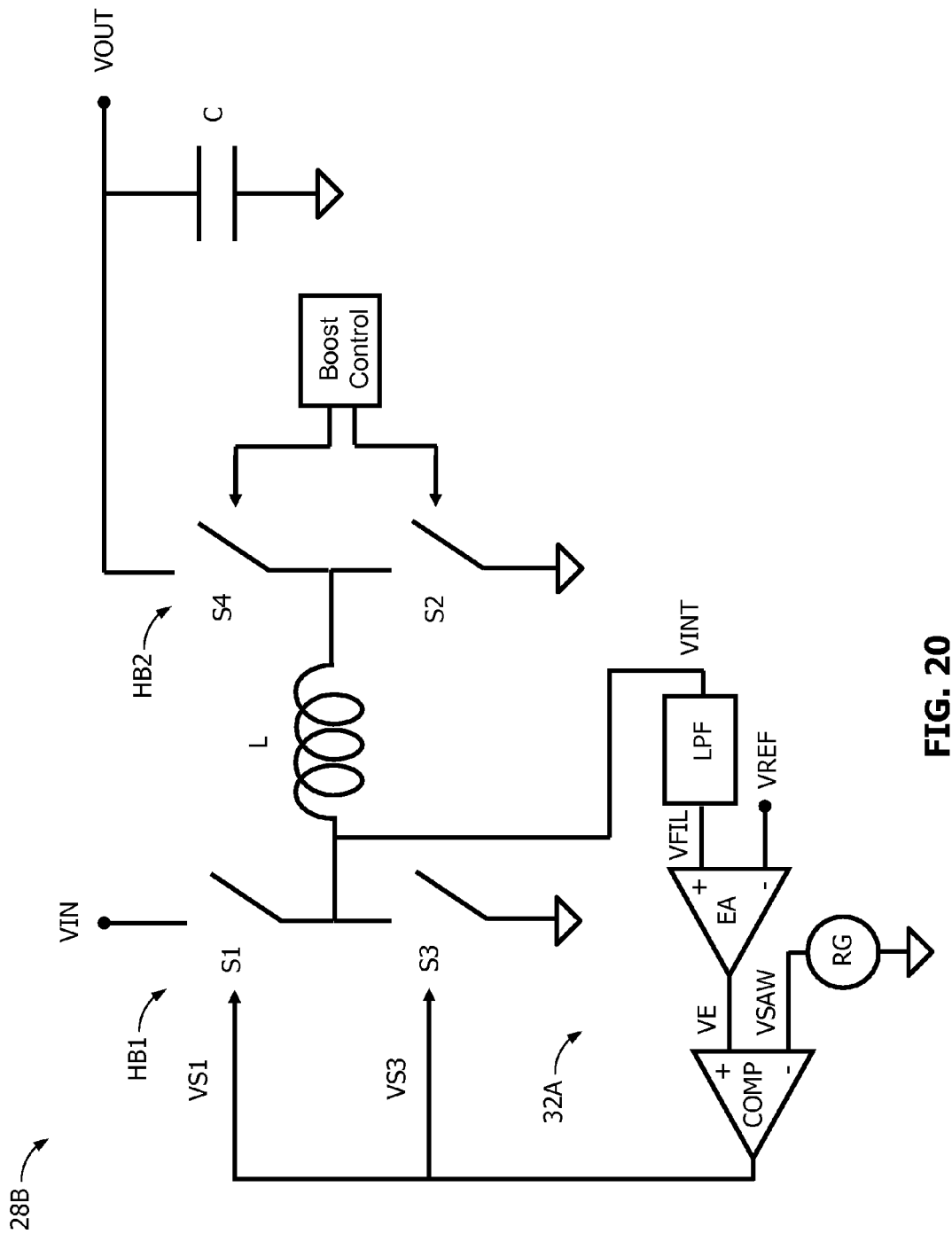
FIG. 20 is a circuit schematic depicting an embodiment of the intermediate-voltage-controlled buck control portion of the four-switch H-bridge buck-boost converter of FIG. 10.

FIG. 20 depicts an embodiment similar to that of FIG. 11, but in which the four-switch H-bridge converter 28B of FIG. 10 is used instead of the two-switch H-bridge converter 28A. In the embodiment of FIG. 20, the same intermediate-voltage-controlled buck control portion 32A from FIG. 11 can be used to generate both the first and third switching signals VS1, VS3 for the first and third switches S1, S3 of the first half-bridge HB1. To accommodate the same switching signal being used for both the first and third switching signals VS1, VS3, the first and third switches S1, S3 can be configured to operate as antiphase switches. For example, the first switch S1 can be implemented as a single PMOS transistor and the third switch S3 can be implemented as a single NMOS transistor, and therefore a single switching signal that turns the first switch S1 on will simultaneously turn the third switch S3 off, and vice versa.

Generally speaking, any of the switches S1, S2, S3, S4 discussed herein can be implemented as single transistors, although other embodiments are also possible. For example, a particular switch can also be implemented by a plurality of transistors, such as by a complimentary pair of NMOS and PMOS transistors. Also, transistors of various types, such as low threshold or high threshold transistors, and transistors manufactured with various process conditions and structural configurations, can be used to implement the various switches discussed herein.

The combined pulse-width-modulation control portion 40B depicted in FIG. 6 can also be implemented as a current-mode combined buck and boost control portion 40Bb. Unlike the embodiment of FIG. 7, a current-mode combined control portion 40Bb senses a current, in addition to the output voltage VOUT, as part of a feedback loop to control the magnitude of the output voltage VOUT at an intended value. The current-mode pulse-width modulation combined control portion 40Bb can sense a current in, for example, the inductor L or one of the switches S2, S4 of the second half-bridge HB2. A current mode pulse-width-modulation combined control portion 40Bb can include a mode selection circuit that determines the what mode, i.e., buck, boost or buck-boost mode, in which the converter 28 operates in response to certain magnitudes of the input voltage VIN and the intended output voltage VIO.

Figure 21:
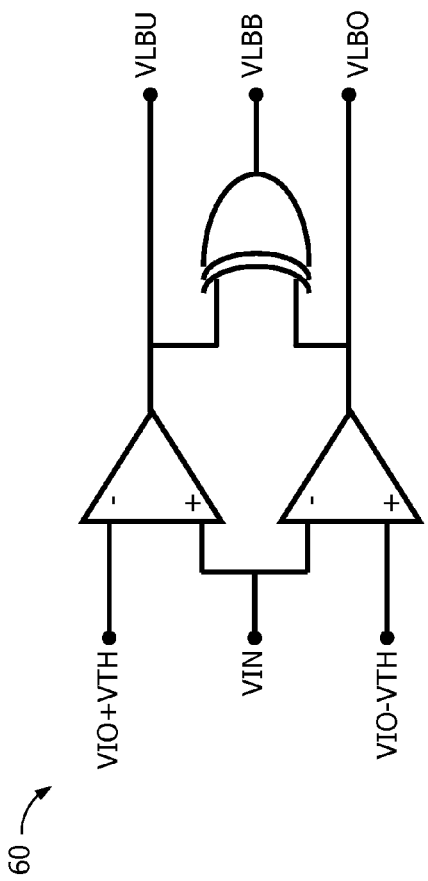
FIG. 21 is a circuit schematic depicting an embodiment of a mode selection circuit of a current-mode combined buck and boost control portion.
Figure 22:
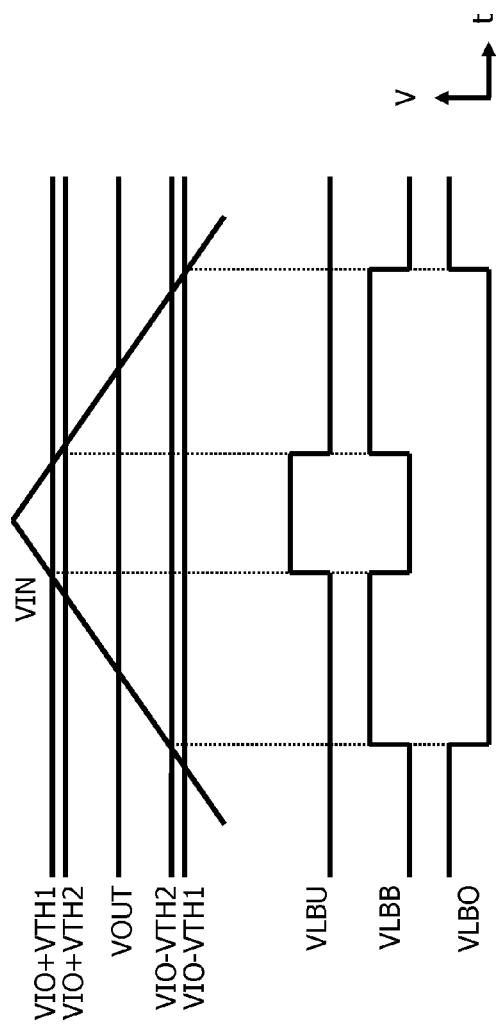
FIG. 22 depicts exemplary voltage waveforms associated with the operation of the mode selection circuit of FIG. 21.

FIG. 21 depicts an embodiment of a mode selection circuit 60 that can be used for mode selection in the current-mode combined control portion 40Bb. FIG. 22 depicts exemplary voltage waveforms associated with the operation of the mode selection circuit 60 of FIG. 21. In operation, the input voltage VIN is monitored and compared to a voltage threshold VTH above and below and intended output voltage VIO. When the input voltage VIN rises above the voltage threshold VTH above the intended output voltage VIO, the mode selection circuit 60 generates a logic-high level of a logic selection signal VLBU that indicates operation in the buck mode. When the input voltage VIN falls below the voltage threshold VTH below the intended output voltage VIO, the mode selection circuit 60 generates a logic-high level of a logic selection signal VLBO that indicates operation in the buck mode. When the input voltage VIN falls between the voltage threshold VTH above and below the intended output voltage VIO, the mode selection circuit 60 generates a logic-high level of a logic selection signal VLBB that indicates operation in the buck-boost mode. As depicted in FIG. 22, the mode selection circuit 60 can implement a voltage hystereses effect to generate different voltage thresholds VTH1, VTH2 for an increasing and decreasing input voltage VIN.

One problem with the mode selection circuit 60 of FIG. 21, however, is that each of the logic signals VLBU, VLBB, VLBO indicating operation in a particular of the buck, buck-boost and boost modes has a logic-enable phase that is exclusive of each of the other of the logic signals VLBU, VLBB, VLBO. That is, the transition between the buck, buck-boost and boost modes, i.e., buck mode to buck-boost mode and buck-boost mode to boost mode and vice versa, are relatively difficult transitions for a current-mode combined control portion 40Bb to handle effectively, and typically result in voltage glitches or spikes, during mode transitions, at the output voltage VOUT of the H-bridge buck-boost converter 28 when the mode selection circuit 60 of FIG. 21 is used in a current-mode combined control portion 40Bb. Moreover, such output voltage glitches can be present in other types of control circuits for H-bridge buck-boost converters, including control circuits that do not use the mode selection circuit 60 of FIG. 21, and control circuits that implement voltage-mode feedback control instead of current-mode feedback control. Generally speaking, such glitches in the output voltage VOUT at mode transition can be undesirable from a circuit performance standpoint.

In one embodiment, the H-bridge buck-boost converter 28A of FIG. 11 can be configured to have a relatively more-advantageous reduced-glitch mode-transition scheme. To achieve this operation, the control portions 32, 36 of the H-bridge buck-boost converter 28A of FIG. 11 can be configured to operate the H-bridge buck-boost converter 28A in only either of two different modes, the buck-boost mode and the boost mode. One advantage of this embodiment is that mode transitions are in general reduced. That is, in such an embodiment there are no buck to buck-boost mode (and vice versa) transitions. This reduces the overall number of mode transitions that such a reduced-glitch H-bridge buck-boost converter 28A will experience over a typical course of operation.

As discussed above, one way to implement boost mode switching for a two-switch H-bridge converter 28A is to keep the first switch S1 continuously on and only switch the second switch S2 on and off with a duty cycle selected to control the degree of voltage boost. One way to implement buck-boost mode for a two-switch H-bridge converter 28A is to switch both the first and second switches S1, S2 on and off with duty cycles selected to control the degree of voltage buck and/or boost. For a four-switch H-bridge converter 28B, one way to implement boost mode switching is to keep the first switch S1 continuously on, the third switch S3 continuously off, and only switch the second and fourth switches S2, S4 on and off with duty cycles selected to control the degree of voltage boost. For a four-switch H-bridge converter 28B, one way to implement buck-boost mode switching is to switch all four switches S1, S2, S3, S4 on and off with duty cycles selected to control the degree of voltage buck and/or boost.

The reduced-glitch H-bridge converter 28 can be implemented by configuring the H-bridge buck-boost converter 28 to only implement only either of these switching schemes for buck-boost and boost mode. That is, the reduced-glitch H-bridge buck-boost converter 28 can be configured to specifically prevent a switching scheme that implements a buck mode. For a two-switch H-bridge converter 28A, the buck mode can be prevented by preventing a switching scheme in which the second switch S2 is kept continuously off and the first switch S1 is switched on and off with duty cycles. For a four-switch H-bridge converter 28B, the buck mode can be prevented by preventing a switching scheme in which the second switch S2 is kept continuously off, the fourth switch S4 is kept continuously on, and the first and third switches S1, S3 are switched on and off with duty cycles.

In one embodiment, the reduced-glitch H-bridge buck-boost converter 28 is configured so that the intermediate-voltage-controlled buck control portion 32A depicted in FIGS. 11 and 20 regulates the average value of the intermediate voltage VINTAVG at a predetermined voltage VPRED below an intended output voltage VIO during buck-boost mode operation. That is, during buck-boost mode operation, when the H-bridge buck-boost converter 28 is operated to output a particular magnitude of the intended output voltage VIO in response to a range of possible magnitudes of the input voltage VIN, the reduced-glitch H-bridge buck-boost converter 28 can be configured to operate so that the average value of the intermediate voltage VINTAVG is regulated to have a magnitude equal to a predetermined voltage drop VRPED below the magnitude of the intended output voltage VIO, or VINTAVG=VIO−VPRED. In the embodiments depicted in FIGS. 11 and 20, this can be achieved by setting the reference voltage VREF to the predetermined voltage drop VPRED below the magnitude of the intended output voltage VIO, or VREF=VIO−VPRED.

Figure 23:
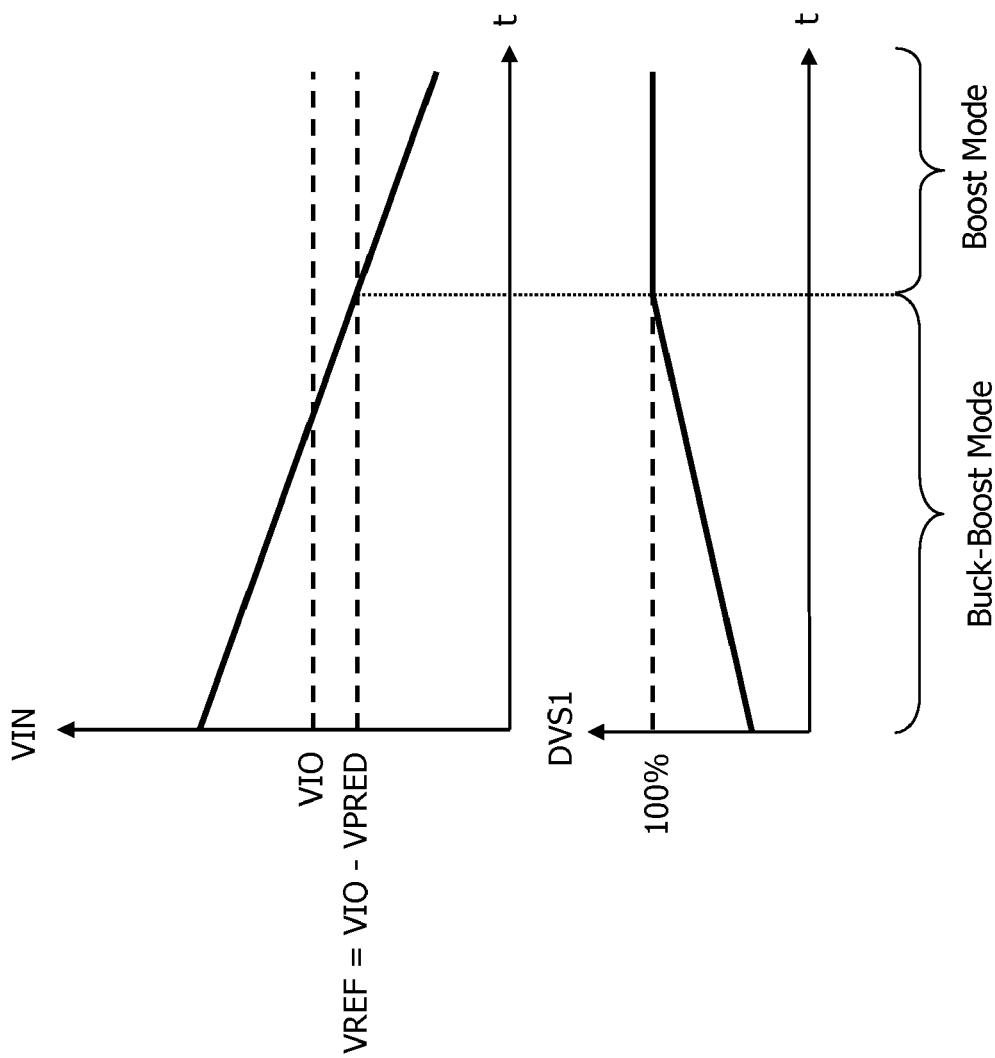
FIG. 23 depicts an embodiment of an input voltage and switching signal duty cycle of a reduced-glitch embodiment of the H-bridge buck-boost converter of FIG. 11, showing division of operation into buck-boost and boost modes.

One benefit of configuring the reduced-glitch H-bridge buck-boost converter 28 to regulate the average value of the intermediate voltage VINTAVG at the predetermined voltage VPRED below the magnitude of the intended output voltage VOUT during buck-boost mode operation is that this allows the H-bridge buck-boost converter 28 to effectively realize the reduced-glitch operation. FIG. 23 depicts one embodiment of the division between buck-boost and boost mode operation of the reduced-glitch H-bridge buck-boost converter 28 in terms of the input voltage VIN and the duty cycle of the first switching signal DVS1 provided by the intermediate-voltage-controlled buck control 32A portion of FIGS. 11 and 20. In the top portion of FIG. 23, the input voltage VIN is shown varying over a range of operation above and below the intended output voltage VIO, as well in relation to the reference voltage VREF set to the predetermined voltage VPRED below the intended output voltage VIO. As depicted in FIG. 23, for magnitudes of the input voltage VIN above the reference voltage VREF, the reduced-glitch H-bridge buck-boost converter 28 operates in buck-boost mode, producing an average value of the intermediate voltage VINTAVG that is reduced in magnitude relative to the input voltage VIN. In this mode, switches of both the first and the second half bridge HB1, HB2 are switched on and off. As the input voltage is reduced, the duty cycle of the first switching signal DVS1 supplied to the first half bridge HB1 gradually increases until the converter operation reaches a point at which the magnitude of the input voltage VIN falls far enough to become equal to the reference voltage VREF, and the converter 28 transitions to the boost mode. In this mode, the first switching signal VS1 has reached a 100% duty cycle and the first switch S is continuously on.

Configuring the reduced-glitch H-bridge buck-boost converter 28 to regulate the average value of the intermediate voltage VINTAVG at the predetermined voltage magnitude VPRED below the intended output voltage VIO during buck-boost mode operation allows an efficient realization of the two-mode operation because it allows a smooth transition between the buck-boost mode and the boost mode. Thus, in addition to less mode transitions in general because of the suppression of the buck mode, this embodiment of the two-mode operation reduces any voltage-glitch affect associated with the remaining buck-boost to boost mode (and vice versa) transitions. This benefit is achieved in part because the duty cycle of the first switching signal DVS1 is gradually increased as the input voltage VIN decreases until it reaches 100%, at which point the first switch S remains continuously on and the converter 28 transitions from buck-boost to boost mode. In such a transition from buck-boost to boost mode, there is therefore no large jump in duty cycle of the first switch DVS1, and therefore the transition is relatively easy for the circuit components to make, and any potential output voltage glitches are relatively minimized.

Figure 24:
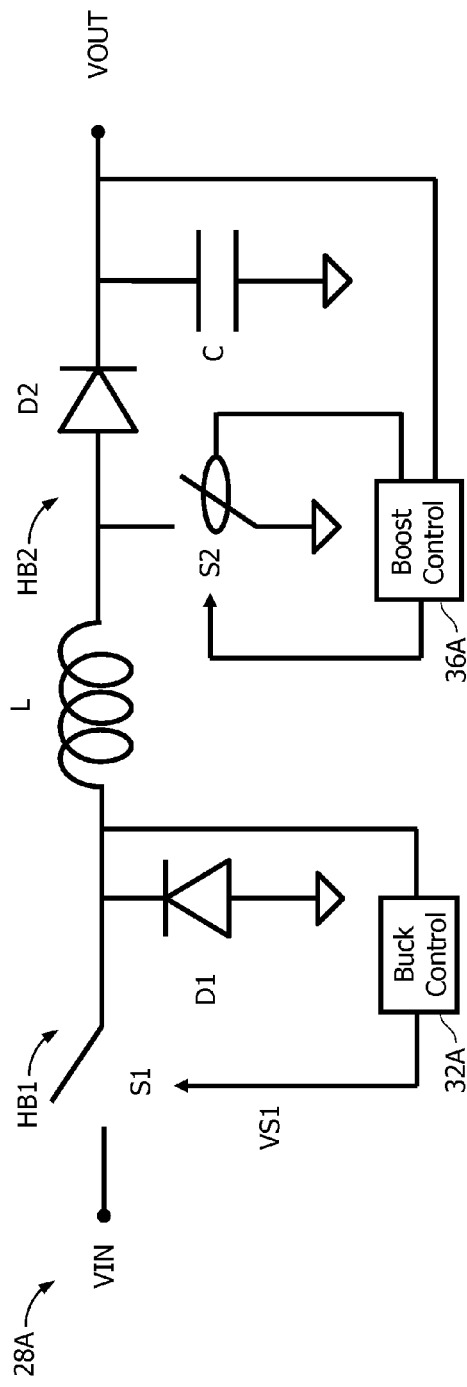
FIG. 24 is a circuit schematic depicting an embodiment of the two-switch H-bridge buck-boost converter having the intermediate-voltage-controlled buck control portion and a current-mode boost control portion.
Figure 25:
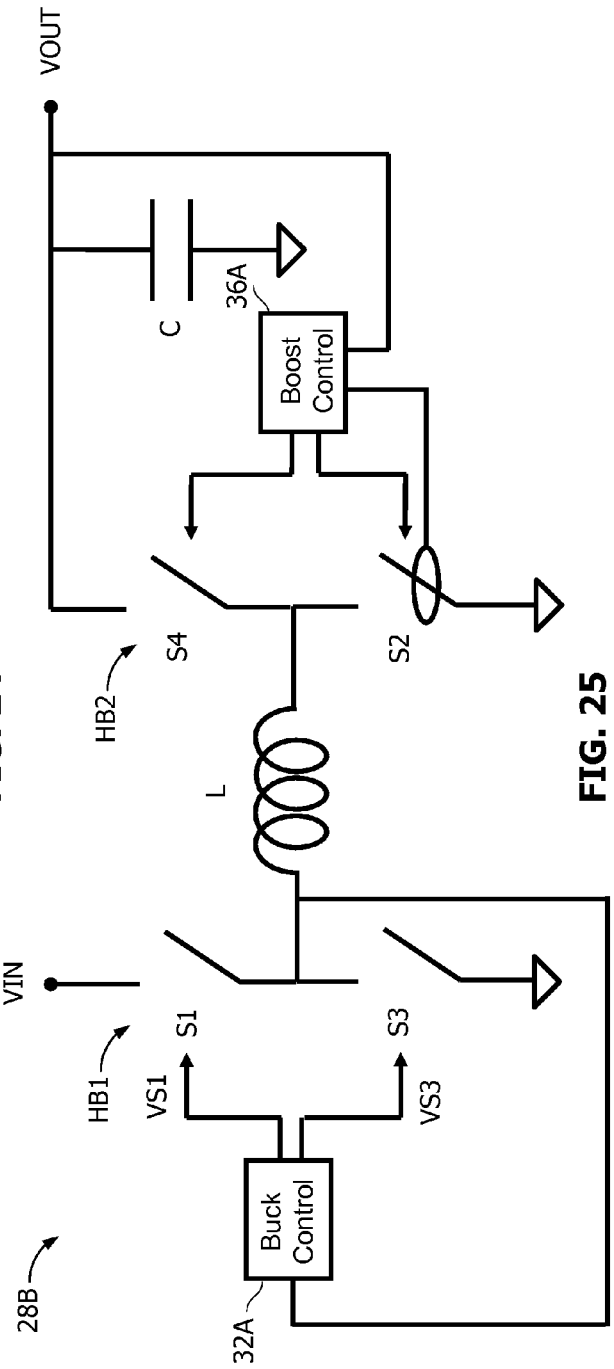
FIG. 25 is a circuit schematic depicting an embodiment of the four-switch H-bridge buck-boost converter having the intermediate-voltage-controlled buck control portion and the current-mode boost control portion.

The intermediate-voltage-controlled buck control portion 32A of the H-bridge buck-boost converter 28A of FIGS. 11 and 20 can be combined with a current-mode boost control portion 36A. FIGS. 24 and 25 depict embodiments of the H-bridge buck-boost converter 28 having the intermediate-voltage-controlled buck control portion 32A and the current-mode boost control portion 36A. FIG. 24 depicts the two-switch H-bridge converter 28A, and FIG. 25 depicts the four-switch H-bridge converter 28B. The depicted current-mode boost control portion 36A samples a current in the second switch S2, as well as the output voltage VOUT, and generates second and fourth switching signals VS2, VS4 for switches S2, S4 of the second half-bridge HB2, i.e., the second switching signal VS2 in FIG. 24 and the second and fourth switching signals VS2, VS4 in FIG. 25, as a function of the sampled second switch current and output voltage VOUT.

Figure 26:
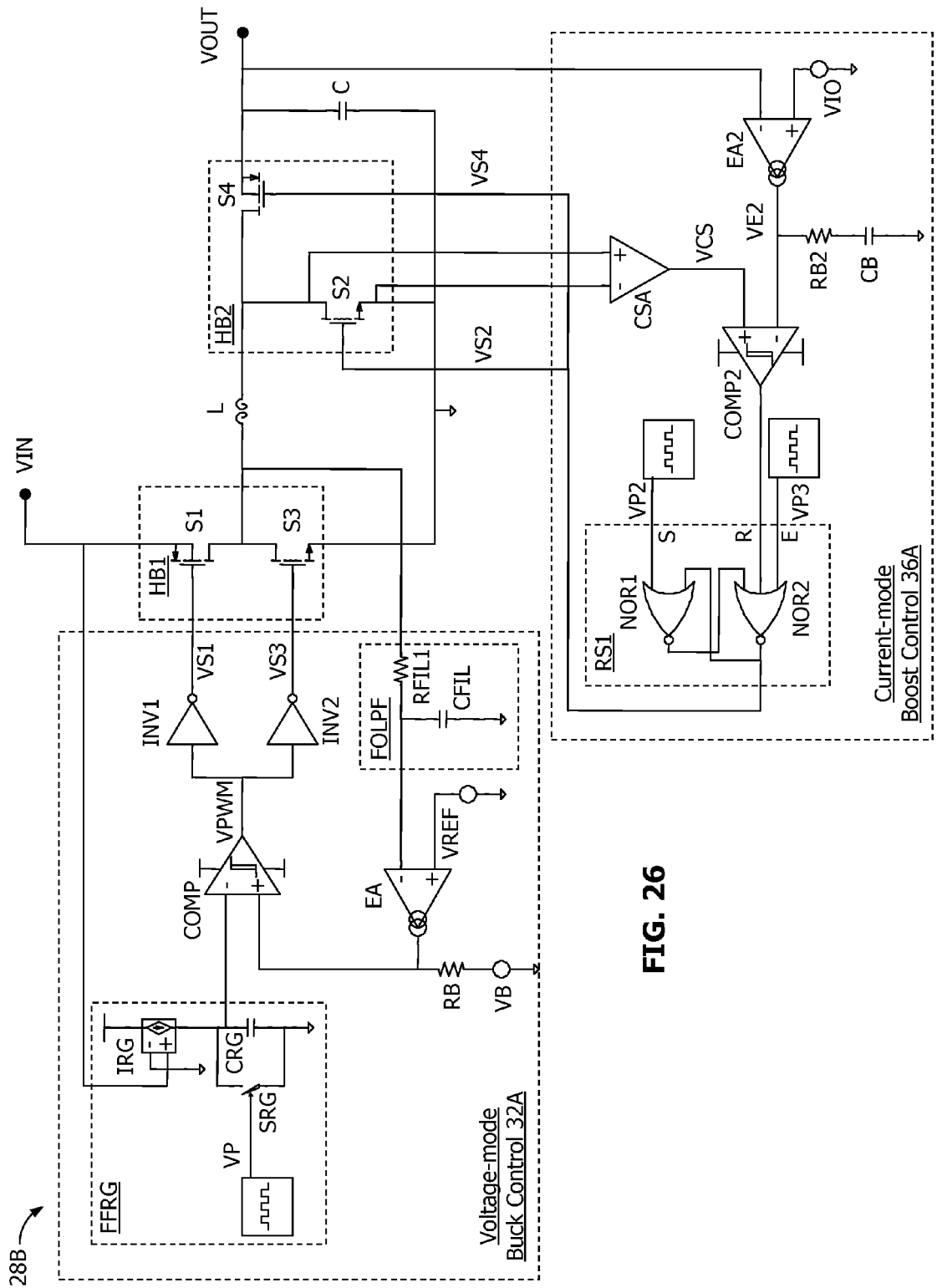
FIG. 26 is a circuit schematic depicting an embodiment of the four-switch H-bridge buck-boost converter of FIG. 25.

FIG. 26 depicts one embodiment of the H-bridge buck-boost converter 28B of FIG. 25. The converter 28B of FIG. 26 includes an embodiment of the intermediate-voltage-controlled buck control portion 32A of FIG. 20 and an embodiment of the current-mode boost control portion 36A. The depicted intermediate-voltage-controlled buck control portion 32A includes a pair of inverters INV1, INV2 used to drive the first and third switches S1, S3. Note that the first and third switching signals VS1, VS3 provided to the first and third switches S1, S3 are identical, but because the first and third switches S1, S3 are implemented as PMOS and NMOS transistors, respectively, antiphase switching is achieved. The depicted intermediate-voltage-controlled buck control portion 32A also includes bias resistor RB and bias voltage VB, to facilitate interconnection and calibration of the error amplifier EA and the comparator COMP. In other embodiments, however, these bias components can be optional or effectively integrated into either the error amplifier EA or the comparator COMP.

The current-mode boost control portion 36A depicted in FIG. 26 samples both the output voltage VOUT and a current in the second switch S2 to generate the second and fourth switching signals VS2, VS4 for the second and fourth transistors S2, S4 of the second half-bridge HB2 as a function of the output voltage VOUT and the current in the second switch S2. As with the first and third switching signals VS1, VS3 generated by the depicted intermediate-voltage-controlled buck control portion 32A, the second and fourth switching signals VS2, VS4 are identical, and antiphase switching of the second and fourth switches S1, S4 is achieved by the use of an NMOS and PMOS transistor implementation of these switches S1, S4, respectively. A current sense amplifier CSA has positive and negative inputs connected to opposite ends of the second switch S2, i.e., to the source and drain of the second switch NMOS transistor, and generates a current-sense voltage VCS as a function of the current in the second switch S2. An error amplifier EA has positive and negative inputs connected to the intended output voltage VIO and the output voltage VOUT, respectively, and generates an error signal VE2 as a function of the deference between these two voltages. A comparator COMP2 has positive and negative inputs that receive the current-sense voltage VCS and the error signal VE2. An output of the comparator COMP2 is connected to a pair of NOR gates NOR1, NOR2, configured as an RS latch RS1. The output of the comparator COMP2 is connected to the reset terminal R of the RS latch RS1. Additionally, a set terminal S of the RS latch RS1 receives a second voltage pulse VP2, and an enable terminal E of the RS latch RS1 receives a third voltage pulse VP3. The output of the RS latch RS1 is used as the second and fourth switching signals VS2, VS4.

In one embodiment, the value of the predetermined voltage drop VRPED below the magnitude of the intended output voltage VIO, to which the average value of the intermediate voltage VINTAVG can be regulated, can be chosen as a function of the operation of the current-mode boost control portion 36A. For example, it may be desirable to configure the current-mode boost control portion 36A to generate the second switching signal VS2 such that the second switching signal VS2 has a minimum duty cycle. Such a minimum second-switching-signal duty cycle may be advantageous to account for noise that may be associated with the operation of the second switch 52. That is, a minimum second-switching-signal duty cycle can provide a so-called blanking time to enable any oscillations present at the second switch to subside to a suitable degree. However, this minimum second-switching-signal duty cycle may translate to a minimum amount of voltage boost which the duty cycle of the second switching signal can be adjusted to provide. Thus, in one embodiment, the value of the predetermined voltage drop VRPED below the magnitude of the intended output voltage VIO can be chosen to be equal to or greater than this minimum amount of voltage boost which the duty cycle of the second switching signal VS2 can be adjusted to provide.

Figure 27A:
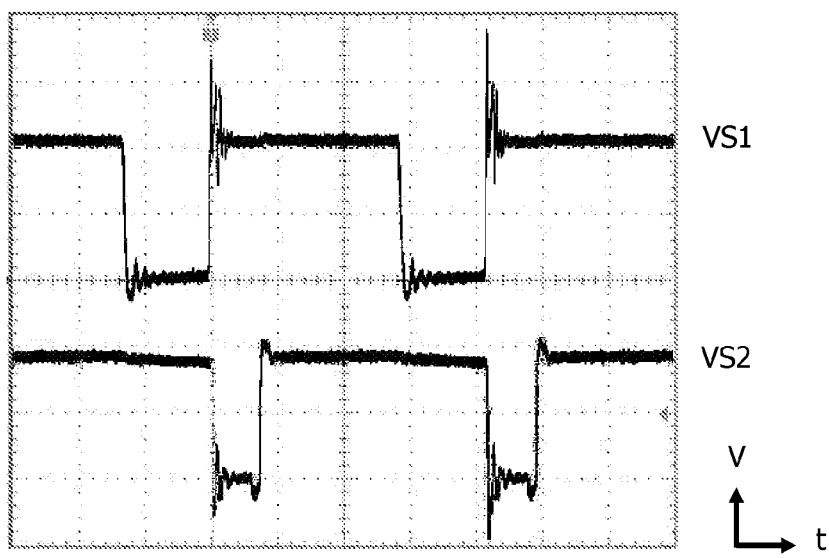
FIG. 27A depicts an embodiment of first and second switching signals generated by the embodiment of FIG. 26 operating in buck-boost mode when the input voltage is greater than an intended output voltage.
Figure 27B:
FIG. 27B depicts an embodiment of the first and second switching signals generated by the embodiment of FIG. 26 operating in buck-boost mode when the input voltage is substantially the same as the intended output voltage.
Figure 27C:
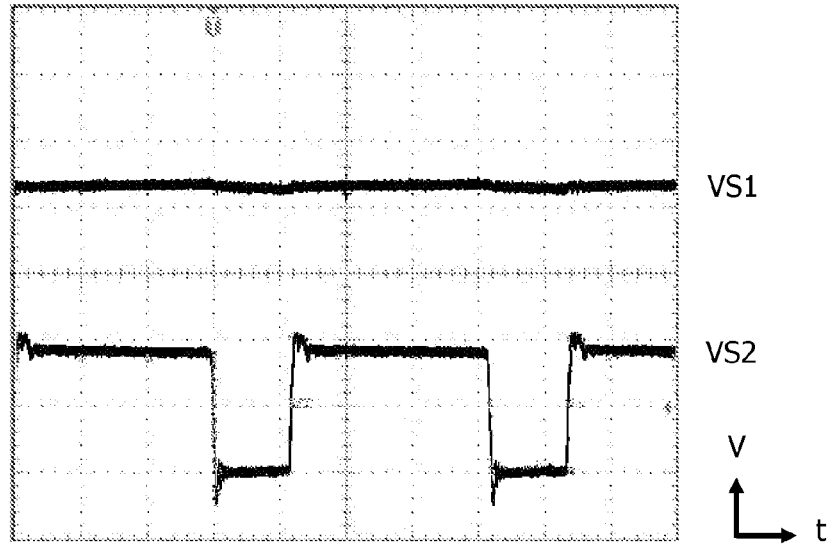
FIG. 27C depicts an embodiment of the first and second switching signals generated by the embodiment of FIG. 26 operating in boost mode when the input voltage is less than the intended output voltage.

FIGS. 27A-27C depict embodiments of voltage waveforms associated with the operation of the reduced-glitch H-bridge buck-boost converter 28B depicted in FIG. 26. FIG. 27A depicts embodiments of voltage waveforms associated with operation in buck-boost mode. In FIG. 27A, the magnitude of the input voltage is greater than the magnitude of the intended output voltage VIO. The top waveform represents a couple of cycles of the first switching signal VS1 generated by the intermediate-voltage-controlled buck control portion 32A to switch the switches S1, S3 of the first half-bridge HB1, and the bottom waveform represents a couple of cycles of the second switching signal VS2 generated by the current-mode boost control portion 36A to switch the switches S2, S4 of the second half-bridge HB2. In FIG. 27A, the average value of the intermediate voltage VINTAVG is being regulated to the reference voltage VREF, which is below the intended output voltage VIO by the predetermined voltage difference VPRED. Thus, the input voltage VIN undergoes a buck operation to produce the average value of the intermediate voltage VINTAVG, and the average value of the intermediate voltage VINTAVG undergoes a boost operation to produce the output voltage VOUT.

FIG. 27B also depicts embodiments of voltage waveforms associated with the operation of the H-bridge buck-boost converter 28B in buck-boost mode. In FIG. 27B, the magnitude of the input voltage VIN magnitude is approximately equal to the magnitude of the intended output voltage VIO. The top waveform again represents a couple of cycles of the first switching signal VS1, and the bottom waveform represents a couple of cycles of the second switching signal VS2. In FIG. 27B, the average value of the intermediate voltage VINTAVG is again being regulated to the reference voltage VREF, which is below the intended output voltage VIO by the predetermined voltage difference VPRED. Thus, the input voltage VIN again undergoes a buck operation to produce the average value of intermediate voltage VINTAVG, and the average value of the intermediate voltage VINTAVG undergoes a boost operation to produce the output voltage VOUT. Note that the scenarios of both FIGS. 27A and 27B regulate the average value of the intermediate voltage VINTAVG to the same magnitude, namely to the reference voltage VREF, and thus the duty cycle of the second switching signal VS2 is substantially the same as in FIG. 27A because the boost operation being performed to produce the output voltage VOUT from the regulated average value of the intermediate voltage VINTAVG is essentially the same in both FIGS. 27A and 27B.

FIG. 27C depicts embodiments of voltage waveforms associated with boost mode operation. In FIG. 27C, the input voltage VIN is less than the reference voltage VREF, i.e., less than the intended output voltage VIO minus the predetermined voltage difference VPRED. The top waveform again represents a couple of cycles of the first switching signal VS1, and the bottom waveform represents a couple of cycles of the second switching signal VS2. In FIG. 27C, the average value of the intermediate voltage VINTAVG is no longer being regulated to the reference voltage VREF. Instead, the converter 28B has transitioned to boost mode operation, and the first switching signal VS1 has a 100% duty cycle, and thus the input voltage VIN is passed unmodified to the intermediate voltage VINT. Note that now the duty cycle of the second switching signal (which is logic-low enabled in FIGS. 27A-C, whereas the first switching signal is logic-high enabled in FIGS. 27A-C) has grown relative to the scenarios of FIGS. 27A and 27B, indicating that the boost operation to convert the intermediate voltage VINT to the intended output voltage VIO now requires a greater degree of voltage boost than when the average value of the intermediate voltage VINTAVG had been regulated to the reference voltage VREF.

Figure 28:
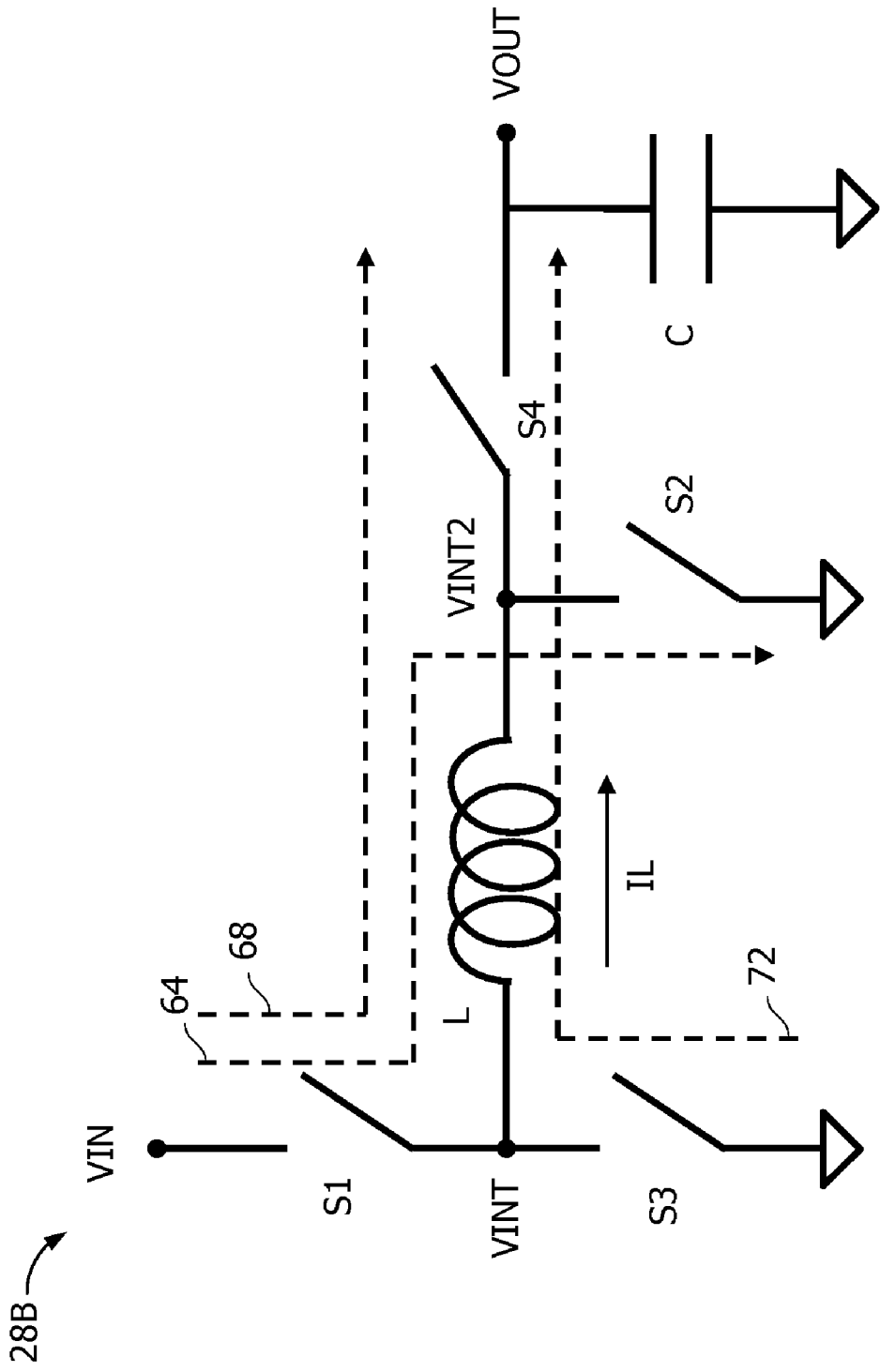
FIG. 28 is a circuit schematic depicting an embodiment of the four-switch H-bridge buck-boost converter showing current pathways during buck-boost mode operation.

FIG. 28 depicts the H-bridge buck-boost converter 28B of FIG. 26 with the buck and boost control portions 32A, 36A omitted for clarity, but including a schematic representation of current pathways during buck-boost mode operation of the buck-boost converter 28B by the buck and boost control portions 32A, 36A. A first current pathway 64 exists when the first switching signal VS1 turns on the first switch S1 and turns of the third switch S3, while the second switching signal VS2 turns on the second switch S2 and turns off the fourth switch S4. A second current pathway 68 exists when the first switching signal VS1 turns on the first switch S1 and turns of the third switch S3, while the second switching signal VS2 turns off the second switch S2 and turns on the fourth switch S4. A third current pathway 72 exists when the first switching signal VS1 turns off the first switch S1 and turns on the third switch 53, while the second switching signal VS2 turns off the second switch 52 and turns on the fourth switch S4.

Figure 29:
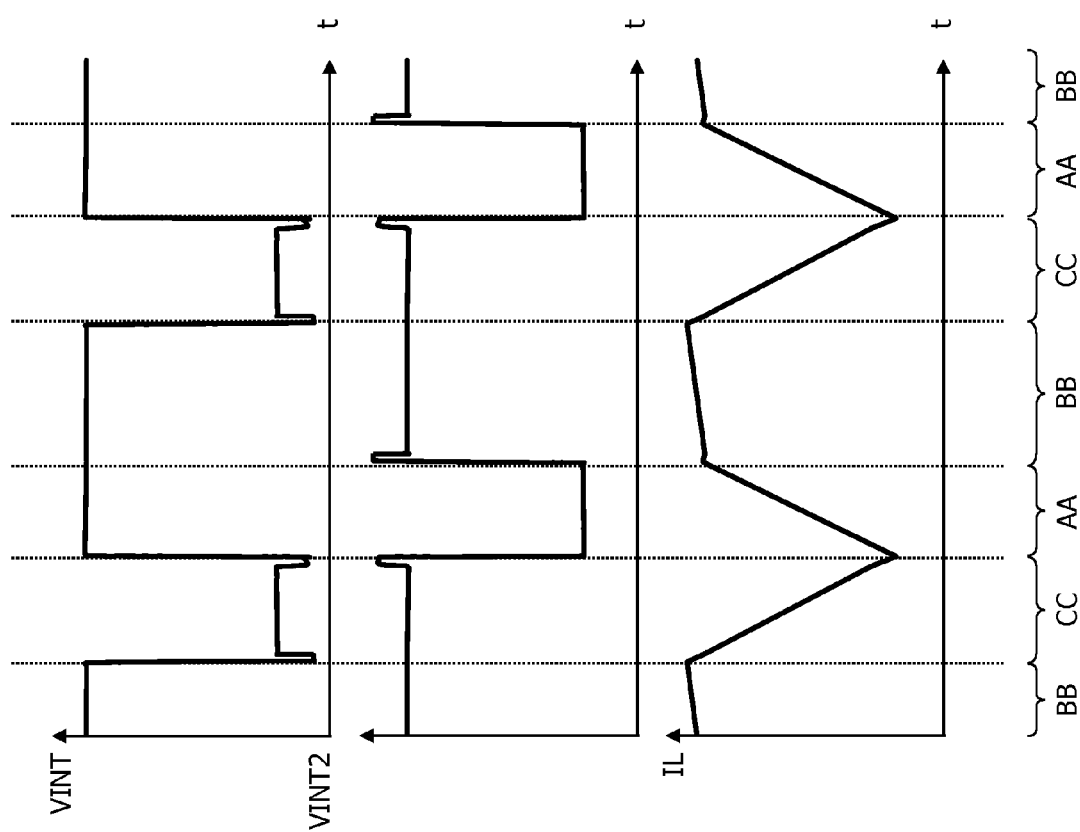
FIG. 29 depicts embodiments of voltage waveforms associated with the operation of the four-switch H-bridge buck-boost converter of FIG. 28.

FIG. 29 depicts embodiments of voltage waveforms associated with the operation of the buck-boost converter 28B in buck-boost mode as depicted in FIG. 28. The top portion of FIG. 29 depicts the intermediate voltage VINT at the input side of the inductor L, the middle portion depicts a second intermediate voltage VINT2 at an output side of the inductor L, and the bottom portion depicts a current IL in the inductor L. FIG. 29 also depicts the association of the various current pathways 64, 68, 72 of FIG. 28 with specific regions of the depicted voltage waveforms. In regions AA the first current pathway 64 is active, in regions BB the second current pathway 68 is active, and in regions CC the third current pathway 72 is active.

The separation of the intermediate-voltage-controlled buck control portion 32A and the current-mode boost control portion 36A allows the buck and boost control portions 32A, 36A to generate the first and second switching signals VS1, VS2 at different frequencies. One advantage of generating the first and second switching signals VS1, VS2 at different frequencies is to maximize benefits associated with the increased bandwidth of intermediate-voltage-controlled buck control portion 32A. For example, increasing the frequency of the switching signals provided by the intermediate-voltage-controlled buck control portion 32A can enable the use of lower inductance values of the inductor L as well as relaxed performance requirements of components of the first half-bridge HB1, which can translate to cheaper component costs. FIGS. 30A and 30B depict embodiments of the various voltage pulse signals VP, VP2, VP3 associated with clocking the intermediate-voltage-controlled buck control portion 32A and current-mode boost control portion 36A. In FIG. 30A, the buck and boost control portions 32A, 36A are both clocked at the same frequency, and thus will produce first and second switching signals VS1, VS2 at the same frequency. In FIG. 30B, the buck and boost control portions 32A, 36A are clocked at different frequencies, and thus will produce first and second switching signals VS1, VS2 at different frequencies. As depicted in FIG. 30B, because the intermediate-voltage-controlled buck control portion 32A is capable of achieving a relatively higher bandwidth, the intermediate-voltage-controlled buck control portion 32A can be clocked at a higher frequency than the current-mode boost control portion 36A, which will produce a first switching signal VS1 having a higher frequency than the second switching signal VS2. This is shown in FIG. 30B by the first voltage pulse VP, associated with the intermediate-voltage-controlled buck control portion 32A, having a frequency that is double that of the second and third voltage pulses VP2, VP3, associated with the current-mode boost control portion 36A.

Figure 31B:
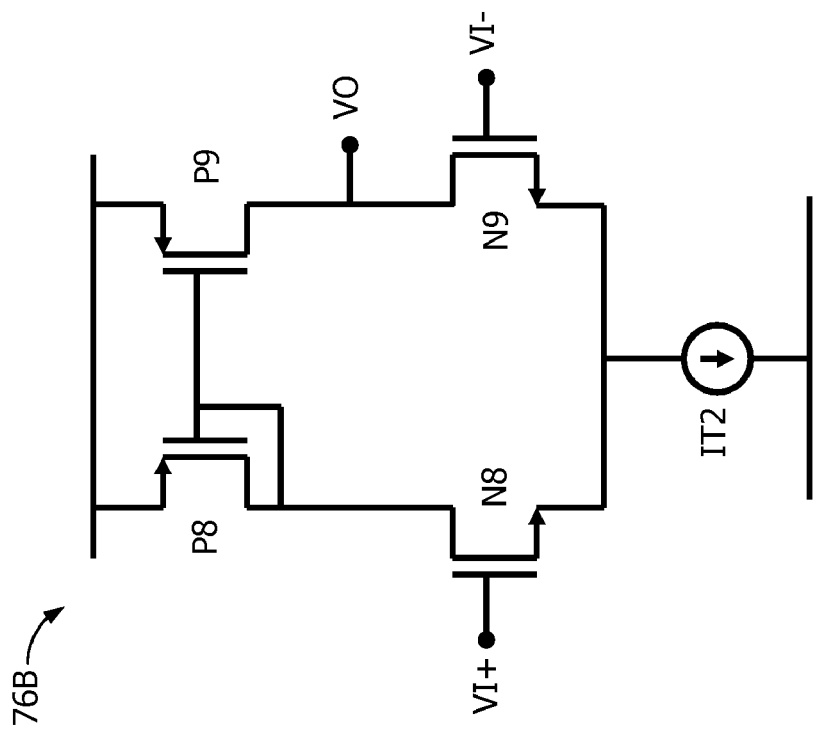
FIG. 31B is a circuit schematic depicting another embodiment of a circuit that can be used as the amplifier or the comparator of the intermediate-voltage-controlled buck control portion and current-mode boost control portion.
Figure 31A:
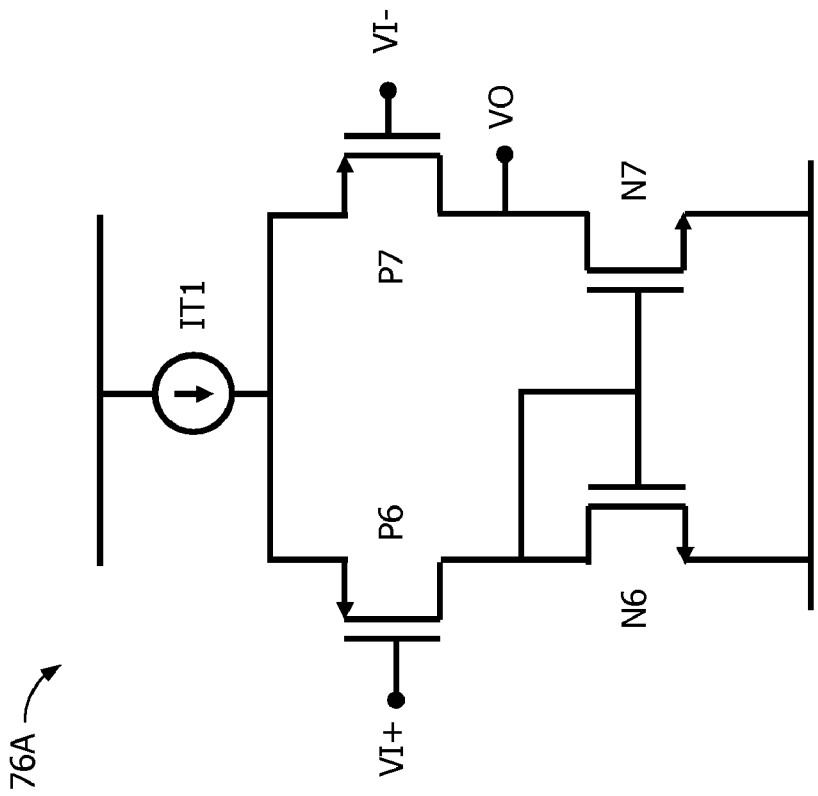
FIG. 31A is a circuit schematic depicting an embodiment of a circuit that can be used as an amplifier or a comparator of the intermediate-voltage-controlled buck control portion and current-mode boost control portion.

The various error amplifiers, comparators, and current sense amplifiers discussed herein and depicted in the figures can have a variety of embodiments. FIGS. 31A-31B depicts exemplary embodiments of amplifying circuits 76A, 76B than can be used to construct the buck control error amplifier EA, the boost control error amplifier EA2, the buck control comparator COMP, the boot control comparator COMP2 and the current sense amplifier CSA. The amplifying circuit 76A of FIG. 31A includes positive and negative input terminals VI+, VI−, an output terminal VO, a PMOS differential pair P6, P7, an NMOS active load N6, N7 configured to perform differential to single-ended signal conversion, and a tail-current source IT1. The embodiment of FIG. 31B includes positive and negative input terminals VI+, VI−, an output terminal VO, an NMOS differential pair N8, N9, an PMOS active load P8, P9 configured to perform differential to single-ended signal conversion, and a tail-current source IT2. The amplifying circuits 76A, 76B of FIGS. 31A-31B can be tailored to provide characteristics specific to a particular one of the buck control error amplifier EA, the boost control error amplifier EA2, the buck control comparator COMP, the boot control comparator COMP2 and the current sense amplifier CSA by adjusting parameters such as transistor size, bias conditions, etc. Many other embodiments of the buck control error amplifier EA, the boost control error amplifier EA2, the buck control comparator COMP, the boot control comparator COMP2 and the current sense amplifier CSA are possible.

Figure 32:
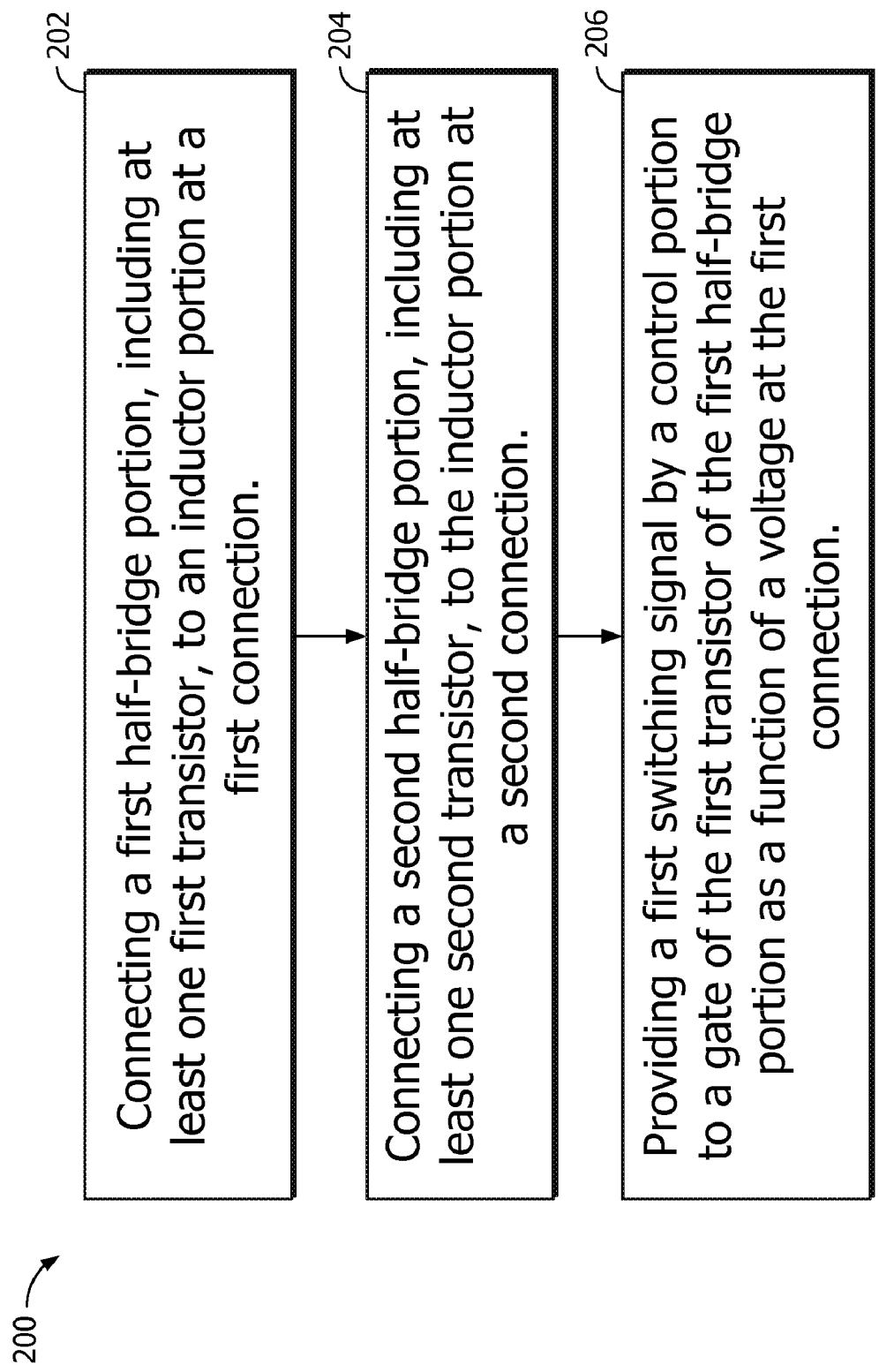
FIG. 32 is a flowchart depicting an embodiment of a method.

FIG. 32 depicts an embodiment of a method 200. In step 202, the method 200 includes connecting the first half-bridge portion HB1, including at least one first transistor, to an inductor portion L at a first connection VINT. In step 204, the method 200 includes connecting a second half-bride portion HB2, including at least one second transistor, to the inductor portion L at a second connection VINT2. In step 206, the method 200 includes providing the first switching signal VS1 by a control portion to the gates of the first transistor of the first half-bridge portion HB1 as a function of a voltage at the first connection.

Further embodiments are also possible, which are the result of variously combining elements or embodiments described herein.

What is claimed is:

1. An H-bridge buck-boost converter, comprising:
a first half-bridge including at least one first transistor;
an inductor connected to the first half-bridge at a first connection;
a second half-bridge, including at least one second transistor, connected to the inductor at a second connection; and
a controller connected to the first connection, to receive a voltage of the first connection and provide a first switching signal to a gate of the first transistor of the first half-bridge as a function of the received first connection voltage.

2. The H-bridge buck-boost converter of claim 1, wherein the controller regulates an average value of the voltage at the first connection to be less than an intended output voltage magnitude of the H-bridge buck-boost converter.

3. The H-bridge buck-boost converter of claim 2, wherein the controller regulates the average value of the voltage at the first connection to be substantially equal to a reference magnitude that is a predetermined amount less than an intended output voltage magnitude of the H-bridge buck-boost converter.

4. The H-bridge buck-boost converter of claim 1, wherein the controller is configured to provide the first switching signal, and a second switching signal to a gate of the second transistor of the second half-bridge, to operate the H-bridge buck-boost converter in either of only two different modes, including a buck-boost mode and a boost mode, wherein in the buck-boost mode the H-bridge buck-boost converter provides both buck and boost conversion without changing mode, and in the boost mode, the H-bridge buck-boost converter provides only boost conversion.

5. The H-bridge buck-boost converter of claim 4, wherein the controller is configured to prevent a buck mode from occurring.

6. The H-bridge buck-boost converter of claim 1, wherein the controller includes a buck control portion that provides the first switching signal to regulate the voltage at the first connection, and a boost control portion that provides a second switching signal to a gate of the second transistor of the second half-bridge to as a function of an output voltage of the H-bridge buck-boost converter and a current of the second transistor.

7. The H-bridge buck-boost converter of claim 6, wherein the buck control portion imparts not greater than a substantially 90° phase shift to a feedback control signal.

8. The H-bridge buck-boost converter of claim 4, wherein the controller portion operates the H-bridge buck-boost converter in the buck-boost mode when a magnitude of an input voltage to the H-bridge buck-boost converter is greater than a reference magnitude, and in boost mode when the input voltage magnitude is less than the reference magnitude, the reference magnitude being a predetermined amount less than an intended output voltage magnitude of the H-bridge buck-boost converter.

9. The H-bridge buck-boost converter of claim 5, wherein the controller is configured to prevent a buck mode from occurring by preventing a mode in which the at least one transistor of the first half-bridge is switched and the at least one transistor of the second half-bridge is not switched.

10. An H-bridge buck-boost converter, comprising:
a first half-bridge including at least one first transistor;
an inductor connected to the first half-bridge at a first connection;
a second half-bridge, including at least one second transistor, connected to the inductor at a second connection; and
a controller configured to provide a first switching signal to a gate of the first transistor of the first half-bridge as a function of a voltage at the first connection, wherein the controller includes a buck control portion that provides the first switching signal to regulate the voltage at the first connection, and a boost control portion that provides a second switching signal to a gate of the second transistor of the second half-bridge to as a function of an output voltage of the H-bridge buck-boost converter and a current of the second transistor, the buck control portion including:
a low-pass filter connected to the first connection;
an error amplifier connected to the low-pass filter and a reference voltage to which a average value of the voltage at the first connection is to be regulated, the error amplifier configured to generate an error signal based on the voltage difference between an output of the low-pass filter and the reference voltage;
a comparator connected to the error amplifier and a ramp generator that generates a saw wave signal, wherein the comparator generates a pulse-width modulation signal as a function of the error signal and the saw wave signal; and
the ramp generator,
wherein the first switching signal is a function of the pulse-width modulation signal.

11. The H-bridge buck-boost converter of claim 10, wherein the low-pass filter is a first-order low-pass filter having a single capacitor.

12. The H-bridge buck-boost converter of claim 10, wherein the ramp generator is an input-voltage feed-forward ramp generator configured to generate the saw wave signal a function of an input voltage to the H-bridge buck-boost converter.

13. A buck-boost converter, comprising:
a first half-bridge;
an inductor connected to the first half-bridge at a connection node;
a second half-bridge connected to the inductor; and
a controller connected to the connection node, configured to receive a voltage of the connection node and control operation of the first half-bridge as a function of the received voltage of the connection node.

14. The buck-boost converter of claim 13, wherein the controller is configured to operate the buck-boost converter in either of only two different modes, including a buck-boost mode and a boost mode, wherein in the buck-boost mode the H-bridge buck-boost converter provides both buck and boost conversion without changing mode, and in the boost mode, the H-bridge buck-boost converter provides only boost conversion.

15. The buck-boost converter of claim 13, wherein the controller is configured to prevent a buck mode from occurring.

16. The buck-boost converter of claim 13, wherein the controller portion includes a buck control portion that provides a first switching signal to the first half-bridge to regulate an average value of a voltage at the connection of the first half-bridge to the inductor, and a boost control portion that provides a second switching signal to the second half-bridge as a function of an output voltage of the buck-boost converter.

17. The buck-boost converter of claim 13, wherein the buck control portion regulates the average value of the voltage at the connection of the first half-bridge to the inductor to have a magnitude substantially equal to a reference magnitude that is a predetermined amount less than an intended output voltage magnitude of the buck-boost converter.

18. A method, comprising:
connecting a first half-bridge, including at least one first transistor, to an inductor at a first connection;
connecting a second half-bridge, including at least one second transistor, to the inductor at a second connection; and
receiving, by a controller connected to the first connection, a voltage of the first connection and providing a first switching signal by the controller to a gate of the first transistor of the first half-bridge as a function of the received voltage of the first connection.

19. The method of claim 18, further comprising operating the first half-bridge, inductor and second half-bridge in either of only two different modes, including a buck-boost mode and a boost mode, and preventing a buck mode from occurring, wherein in the buck-boost mode the H-bridge buck-boost converter provides both buck and boost conversion without changing mode, and in the boost mode, the H-bridge buck-boost converter provides only boost conversion.

20. The method of claim 18, further comprising regulating an average value of the voltage at the first connection to have a magnitude substantially equal to a reference magnitude that is a predetermined amount less than an intended output voltage magnitude at an output node of the second half-bridge.

21. An H-bridge buck-boost converter, comprising:
a first half-bridge including at least one first transistor;
an inductor connected to the first half-bridge at a first connection;
a second half-bridge including at least one second transistor, connected to the inductor at a second connection; and
a controller, configured to filter the voltage at the first connection to produce a filtered first-connection voltage, generate an error signal as the difference between the filtered first-connection voltage and a reference voltage, compare the error signal and a saw wave signal to generate a pulse-width modulation signal, and produce the first switching signal as a function of the pulse-width modulation signal.

22. The H-bridge buck-boost converter of claim 21, wherein the controller includes a filter to produce the filtered first-connection voltage, an error amplifier to generate the error signal, and a comparator to generate the pulse-width modulation signal, and at least one inverter to produce the first switching signal.

23. The H-bridge buck-boost converter of claim 1, wherein the controller is configured to operate the H-bridge buck-boost converter in either of only two different modes, including a buck-boost mode and a boost mode, wherein in the buck-boost mode the controller cyclically switches on and off both the at least one first transistor of the first half-bridge and the at least one second transistor of the second half-bridge.

24. An H-bridge buck-boost converter, comprising:
a first half-bridge including at least one first transistor;
an inductor connected to the first half-bridge at a first connection node;
a second half-bridge, including at least one second transistor, connected to the inductor at a second connection node; and
a controller connected to the first connection node, and configured to receive a voltage of the first connection node and provide a first switching signal to a gate of the first transistor of the first half-bridge as a function of the received voltage of the first connection node,
wherein the controller is configured to operate the H-bridge buck-boost converter in either of only two different modes, including a buck-boost mode and a boost mode,
wherein in the buck-boost mode the H-bridge buck-boost converter provides both buck and boost conversion without changing mode, and in the boost mode, the H-bridge buck-boost converter provides only boost conversion, the buck-boost mode including cyclic switching of both the at least one first transistor of the first half-bridge and the at least one second transistor of the second half-bridge.

\* \* \* \* \*